(12) United States Patent
Chen et al.

(10) Patent No.: US 12,514,452 B2
(45) Date of Patent: Jan. 6, 2026

(54) HYPERSPECTRAL CHARACTERISTIC BAND SELECTION METHOD AND ACTIVE HYPERSPECTRAL IMAGING DEVICE USING THE SAME

(71) Applicant: Taichung Veterans General Hospital, Taichung (TW)

(72) Inventors: Hsian-Min Chen, Taichung (TW); Yi-Ming Chen, Taichung (TW); Yi-Jing Sheen, Taichung (TW); Hsin-Che Wang, Taichung (TW); Tsu-Te Hao, Hsinchu County (TW)

(73) Assignee: Taichung Veterans General Hospital, Taichung (TW)

( * ) Notice: Subject to any disclaimer, the term of this patent is extended or adjusted under 35 U.S.C. 154(b) by 749 days.

(21) Appl. No.: 17/749,366

(22) Filed: May 20, 2022

(65) Prior Publication Data
US 2023/0371818 A1    Nov. 23, 2023

(51) Int. Cl.
*A61B 5/00* (2006.01)
*G01N 21/31* (2006.01)
(Continued)

(52) U.S. Cl.
CPC .......... *A61B 5/0075* (2013.01); *A61B 5/7282* (2013.01); *G01N 21/31* (2013.01);
(Continued)

(58) Field of Classification Search
None
See application file for complete search history.

(56) References Cited

U.S. PATENT DOCUMENTS

2018/0232883 A1* 8/2018 Sethi .................... G16H 30/40

FOREIGN PATENT DOCUMENTS

| | | |
|---|---|---|
| CN | 109727280 A | 5/2019 |
| CN | 111652041 A | 9/2020 |
| TW | 202214172 A | 4/2022 |

OTHER PUBLICATIONS

Hsian-Min Chen et al, Hyperspectral Imaging Assessment of Systemic Sclerosis Using the Soft Abundance Score and Band Selection., IEEE Access, vol. 9, 2021( date of publication May 24, 2021).
(Continued)

*Primary Examiner* — Samira Monshi
(74) *Attorney, Agent, or Firm* — Guice Patents PLLC

(57) ABSTRACT

A hyperspectral characteristic band selection method and an active hyperspectral imaging device using the same. The method using a virtual dimension algorithm to calculate a number of endmembers of a hyperspectral image of a predetermined disease, and using between 1 time and 2 times the number of endmembers as a number of predetermined selected bands, and then selecting characteristic bands with a number matching the number of selected bands from a plurality of spectral bands in the image. The device comprises a base, light sources and a sensing portion, the light sources are respectively disposed on the base, bands emitted by the light sources are configured according to the characteristic bands calculated by the method. The sensing portion is disposed on the base and spaced apart from the light sources for receiving reflected light from an external target object irradiated by the light sources to obtain a hyperspectral image.

17 Claims, 25 Drawing Sheets

(51) Int. Cl.
*G06T 7/00* (2017.01)
*H04N 23/51* (2023.01)
*H04N 23/56* (2023.01)

(52) U.S. Cl.
CPC .......... *G06T 7/0012* (2013.01); *H04N 23/51* (2023.01); *H04N 23/56* (2023.01); *A61B 2562/0233* (2013.01); *G06T 2207/30088* (2013.01)

(56) References Cited

OTHER PUBLICATIONS

Yi-Ming Chen et al, Hyperspectral imaging for skin assessment in systemic sclerosis: a pilot study., Rheumatology (Oxford) . Nov. 1, 2020;59(11):3201-3210.

* cited by examiner

HYPERSPECTRAL CHARACTERISTIC BAND SELECTION METHOD AND ACTIVE HYPERSPECTRAL IMAGING DEVICE USING THE SAME

BACKGROUND OF THE INVENTION

Field of Invention

The invention relates to spectral band selection and image detection technology, and more particularly to a hyperspectral characteristic band selection method and an active hyperspectral imaging device using the same.

Related Art

In recent years, with the development of science and technology, image analysis and computing capabilities have been improved to a considerable extent, capable of meeting the needs of computing operations for large amount of data. For example, research related to hyperspectral imaging (HSI) system has flourished. Wherein, the hyperspectral imaging system refers to the collection of spatial information and spectral information of an object to be detected by optical detection, integrated computing is performed, and has the characteristics of non-contact, without causing damage to the detected object and fast operation. To put it simply, the hyperspectral imaging system detects the spectral band range that covers signals of unknown substances that cannot be seen by human eyes, that is, information of more than one hundred continuous spectral bands is collected and stacked into a hyperspectral image hypercube.

For this reason, by virtue of the advantages of being capable of combining with high spatial and spectral resolution, the hyperspectral imaging system is considered to be an analysis and detection tool with high development potential and prospects, and has been applied to industrial products, biomedical material detection, food safety of agricultural products, burns and scalds, and biomedicine. Wherein, due to the non-invasive nature of the hyperspectral imaging system, and by shortening the object distance, spectral information of large areas and small details can be obtained; for medical detection such as disease diagnosis and surgical guidance, especially for autonomous detection in the early stage of disease, the hyperspectral imaging system has high potential in application, making the hyperspectral imaging system a medical application field worthy of further exploration.

For example, the journal article "Hyperspectral imaging for skin assessment in systemic sclerosis: a pilot study" published in 2020 by Chen, Y.-M. et al. has tentatively demonstrated the feasibility of hyperspectral imaging in assessing disease severity of patients with scleroderma. However, the method used in this paper is simply the spectral angle mapper (SAM). The region analyzed by this method is limited to the range of the ultrasound imaging region (ROI), and 9 positions are randomly selected from this range, each position contains 3*3 pixels, so there are a total of 81 pixels, and then after averaging the spectral profiles of these 81 pixels, the disease severity is assessed by the spectral angle mapper (SAM). However, the spectral angle mapper (SAM) used in this paper can only compare the difference between two spectral profiles, and is easily interfered by other external environmental noises (such as skin hair, mole, or microvascular rupture, etc.); and, the region analyzed in this paper is only a local region of interest (such as a part of the hand), so the correlation of the spectra of the overall region of interest cannot be considered.

Moreover, in terms of structural design, the conventional hyperspectral imaging instruments currently available on the market mainly include spectroscope (model Inspector N17E, SPECIM, Oulu, Finland), InGaAs emission microscope (model Xeva-1.7-320, Xenics, Leuven, Belgium) and standard halogen lamp (model 3900e DC, Illumination Technologies, Inc., New York, USA), among which, since the light of halogen lamp is full-band irradiation, the light of other bands other than the near-infrared light (bands between 900 nm and 1700 nm) must be filtered out through the spectroscope first before spectral image collection can be carried out. Furthermore, in order to achieve a predetermined irradiation intensity, a ring-shaped halogen lamp is usually used, and its structural design needs to be configured by supplementing with light pipes, wires and electronic control modules; thus, the design of the spectroscope and the ring-shaped halogen lamp will increase the size of the instrument, which is obviously too bulky. If the conventional hyperspectral imaging instruments are to be used clinically, it is necessary to reduce the weight of the instruments first to be able to allow the clinicians to directly photograph the part of the patient that needs to be analyzed in the consultation room for using as an auxiliary tool for clinical diagnosis or assessment of treatment effectiveness.

In addition, due to the high correlation between the spectral bands included in the hyperspectral image, and the redundancy between each spectral band is relatively high, if no data screening is performed, the amount of data is too large, it takes up a lot of computing resources, and also consumes a longer computing time. Moreover, for different diseases, it may only have analytical value in some specific spectral bands. Accordingly, in order to simplify the amount of data, simplify the steps of hyperspectral image analysis, and to achieve in reducing the components of the conventional instruments and equipment, how to find the specific spectral band of a predetermined disease would be an object that needs to be considered by the relevant manufacturers in the industry.

SUMMARY OF THE INVENTION

A main object of the invention is to provide a hyperspectral characteristic band selection method for simplifying an amount of data, simplifying steps of hyperspectral image analysis by selecting a characteristic band of a predetermined disease under the premise of ensuring an analysis accuracy and for using as a reference for reducing the components of the conventional instruments and equipment.

In order to achieve the above object, the invention discloses a hyperspectral characteristic band selection method mainly using a virtual dimension algorithm to calculate a number of endmembers of a hyperspectral image of a predetermined disease, and using between 1 and 2 times the number of the endmembers as a number of predetermined selected bands, the number being defined as n, and n being a non-zero natural number; and then selecting characteristic bands with a number matching the number of the selected bands from a plurality of spectral bands in the hyperspectral image.

In one embodiment, the predetermined disease is scleroderma, and the number of the selected bands is preferably 1.5 times the number of the endmembers; the predetermined disease is diabetes, and the number of the selected bands is preferably 1 or 1.5 times the number of the endmembers.

In one embodiment, it calculates priority scores of all spectral bands by band prioritization, and uses the top n spectral bands with higher priority scores as characteristic spectra. Wherein, band prioritization selects variance, skewness, kurtosis, entropy or information divergence to calculate the priority score of each of the spectral bands. In addition, when computing analysis is performed by band prioritization, the number of the selected bands is preferably 1.5 times the number of the endmembers.

In one embodiment, the invention further selecting the characteristic bands from the spectral bands by full band analysis method or averaging method. Wherein, when computing analysis is performed by averaging method, the number of the selected bands is preferably 1 time the number of the endmembers.

In one embodiment, further comprising step C, compiling statistics of repetition times of the same characteristic bands selected by full band analysis method, averaging method and band prioritization respectively, and using the characteristic bands with repetition times reaching a predetermined threshold value as the preferred characteristic spectra.

Another embodiment of the invention discloses an active hyperspectral imaging device provided with light sources corresponding to characteristic bands of a predetermined disease, compared with the conventional hyperspectral imaging instrument, it is no longer necessary to reserve a filter and a spectroscope, and also saves the configuration of light pipes and wires of a ring-shaped halogen lamp in order to achieve an object of light-weight and hand-held design, and capable of being used for assessment, early detection or diagnosis of diseases.

Specifically, the active hyperspectral imaging device mainly comprises a base, a plurality of light sources and a sensing portion, wherein each of the light sources is respectively disposed on the base, and bands emitted by each of the light sources are respectively configured according to the characteristic bands or preferred characteristic bands calculated by the hyperspectral characteristic band selection method. The sensing portion is disposed on the base and spaced apart from the light sources, and is used for receiving reflected light from an external target object irradiated by the light sources to obtain a hyperspectral image.

In one embodiment, the light sources are arranged on the base annularly and around the sensing portion at a center position.

In one embodiment, the base comprises a casing, a cover and a seat, wherein the casing has a casing body and an assembly opening, the assembly opening is opened on the casing body, so that an inner space of the casing body communicates externally. The cover has a cover body, a first hole and a recess, wherein the cover body is plate-shaped and connected to the casing body by corresponding to the assembly opening, the first hole penetrates the cover body at a central position, the recess is properly recessed on one side of the cover body and communicates with the first hole.

The seat has an annular seat body and a second hole, the second hole axially penetrates the seat body along a center of the seat body, the seat body is used for inserting into the recess to make the second hole coaxial with the first hole. Wherein, the light sources are arranged annularly on the seat body respectively by using the second hole as a center.

In one embodiment, the sensing portion comprises a main body, a columnar image capturing lens and a processing unit, wherein the main body is disposed in the inner space of the casing. The image capturing lens is disposed on the main body, and is used for passing through the first hole and the second hole, so that one end of a columnar shaft of the lens is exposed outside the casing, and another end of the columnar shaft of the lens is located in the inner space of the casing for capturing the hyperspectral image. The processing unit is disposed on the main body and is electrically connected with the image capturing lens for receiving and analyzing the hyperspectral image.

In one embodiment, the seat is made of ceramic material.

DETAILED DESCRIPTION OF THE INVENTION

Figure 1:
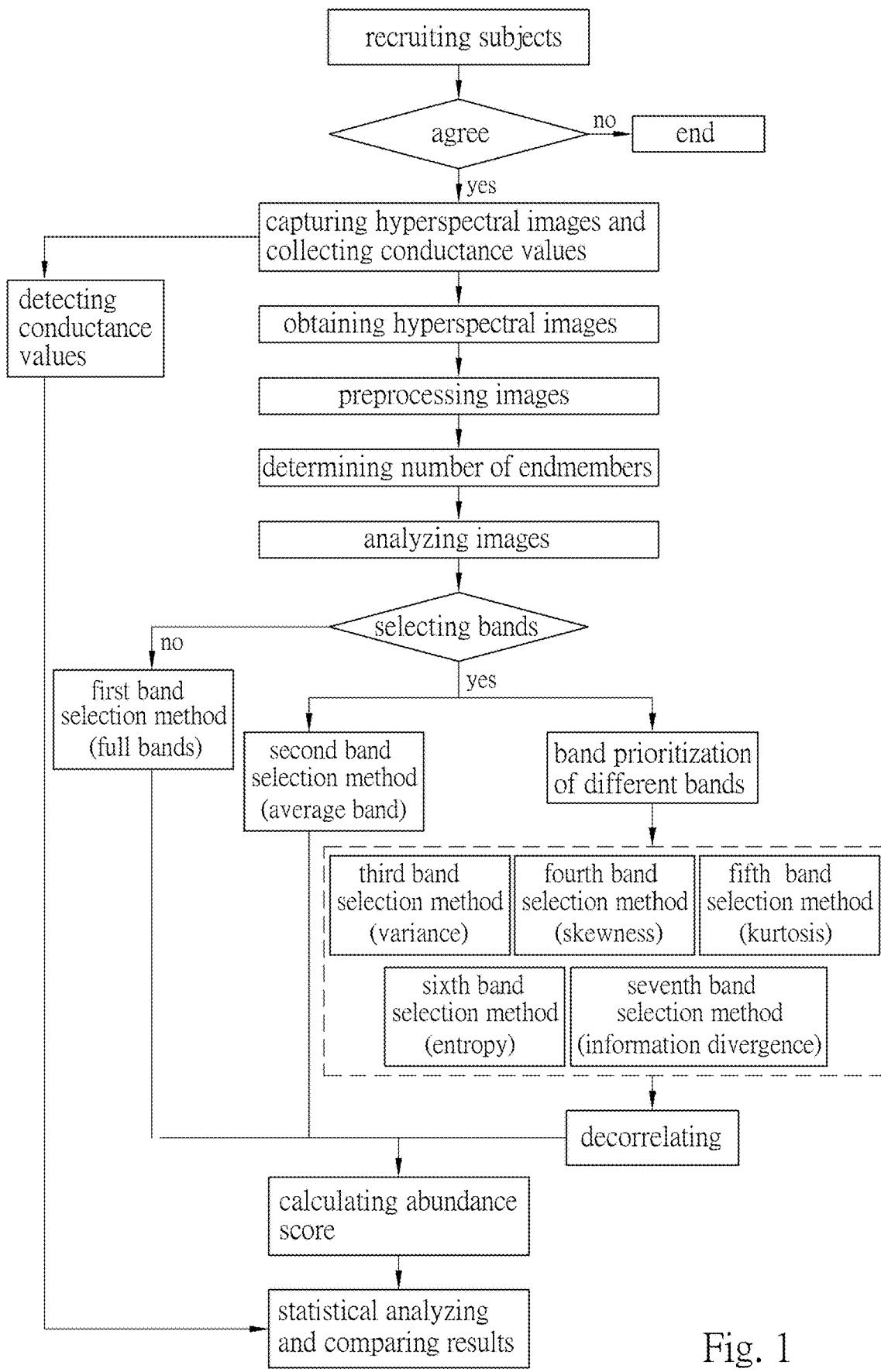
FIG. 1 is a schematic flowchart of example 1 of the invention.

Firstly, specific terms disclosed in the invention are listed and described.

"Healthy person" disclosed in the invention refers to a person who is not suffering from a disease or a tissue sample thereof.

"Hyperspectral image information" disclosed in the invention refers to a hyperspectral image obtained by photographing a predetermined target region through a hyperspectral imaging instrument with a near-infrared light band (wavelength 900 nm-1700 nm), and the obtained hyperspectral image is transformed into a hyperspectral image cube through image augmentation technology. Wherein the target region can be, but is not limited to, the skin of any part of hand, arm, face, neck and foot, and can be classified into normal human skin tissue or abnormal human tissue based on a sampled human health status.

"Hyperspectral profile difference analysis method" disclosed in the invention refers to when establishing standard spectral profile, disease spectral profile, normal spectral profile, discrete images should be excluded first to improve an accuracy of data. Algorithms used include spectral angle mapper (SAM), spectral information divergence (SID), and mean square error (MSE). In addition, the hyperspectral profile difference analysis method can also be used to calculate differences between spectral profiles to obtain prevalence of a disease to be detected.

The so-called "spectral angle mapper" in the invention refers to using the concept of n-dimensional angle to match a similarity between spectral vector signal and target spectral vector signal. The smaller the angle, the closer the target spectral vector signal. The calculation formula is as follows:

$$SAM(s_i, s_j) = \cos^{-1}(s_i \cdot s_j / \|s_i\| \|s_j\|) = \cos^{-1}(\Sigma_{l=1}^{L} s_{il} s_{jl} / [\Sigma_{l=1}^{L} s_{il}^2]^{1/2} [\Sigma_{l=1}^{L} s_{jl}^2]^{1/2}) \quad (1)$$

Wherein, L represents a number of spectral bands.

The "spectral information divergence" disclosed in the invention is derived from the concept of divergence in information theory, and is used to measure a probability behavior difference between spectral features of two pixel vectors. In other words, a spectral similarity between two pixel vectors is measured by differences between probability distributions derived based on their corresponding spectral features. Therefore, differences between the spectral information divergence and the spectral angle mapper are that: the spectral angle mapper compares angular geometric features between two pixel vectors, while the spectral information divergence measures a distance between probability distributions generated by spectral features of two pixel vectors. Therefore, the spectral information divergence can capture an inter-spectral variability more effectively than the spectral angle mapper.

"Image preprocessing technology" disclosed in the invention removes regions of non-interest in the hyperspectral image, that is, to extract the predetermined target region in the image, and then use the hyperspectral profile difference analysis method to exclude discrete data.

"Hyperspectral imaging soft abundance scorer (HISAS) algorithm" disclosed in the invention comprises following steps: determining a number of endmembers, selecting bands, spectral decorrelation energy minimization, and calculating abundance score and abundance map.

"Number of endmembers" or "endmember value" disclosed in the invention refers to a number of endmember components, and the value is directly generated from the image. Currently, the commonly used algorithms are virtual dimension (VD) algorithm, Harsanyi-Farrand-Chang algorithm, pixel purity index (ppi) algorithm, algorithm for simplex volume maximization (N-FINDR), iterative error analysis (IEA), vertex component analysis (VCA) algorithm and minimum volume simplex analysis (MVSA), simplex identification via split augmented Lagrangian (SISAL) algorithm, minimum volume enclosing simplex (MVES) algorithm, minimum volume constraint nonnegative matrix factorization (MVCNMF) algorithm and iterated constrained endmember (ICE).

Description of computation of the "virtual dimension algorithm" disclosed in the invention is as follows:

Assuming that a hyperspectral signal is an unknown and a definite signal source, signal spectrum only affects a first-order statistic (that is, a sample mean), and its noise is Gaussian white noise with a mean value of 0, and only exists in a second-order statistic of the sample. Then, an autocorrelation matrix of the sample is calculated as $R_{L \times L} = \Sigma_{i=1}^{N} r_i r_i^T$, and a covariance matrix as $K_{L \times L} = \Sigma_{i=1}^{N} (r_i - \mu)(r_i - \mu)^T$, and eigenvalues and differences of the two matrices are obtained respectively. Wherein, $\{r_i\}_{i=1}^{N}$ represents a set of sample spectral vectors, $\mu$ represents an average spectral vector of the sample spectral vectors, $\{\hat{\lambda}_1 \geq \hat{\lambda}_2 \geq \ldots \geq \hat{\lambda}_L\}$ and $\{\lambda_1 \geq \lambda_2 \geq \ldots \geq \lambda_L\}$ represent eigenvalues of the two matrices $R_{L \times L}$ and KLXL respectively, and the eigenvalues are called an autocorrelation eigenvalue and a covariance eigenvalue, and L represents the number of the spectral bands. If there is a definite hyperspectral signal source in the image data, there must be a certain spectral dimension l, $1 \leq l \leq L$, and if the condition $\hat{\lambda}_l > \lambda_l$ is established, since the signal affects the sample mean, it increases a variance of the sample autocorrelation matrix $R_{L \times L}$, but the noise does not. Furthermore, the sample autocorrelation matrix $R_{L \times L}$ is independent of an order $R_{L \times L}$ in which the sample is arranged $\{P(i)\}_{i=1}^{N}$.

Then, in order to determine a number of endmembers with large spectral differences, correlation is calculated as follows:

$$H_0: z_l = \hat{\lambda}_l - \lambda_l = 0$$

versus $$H_1: z_l = \hat{\lambda}_l - \lambda_l > 0 \text{ for } l = 1, 2, \ldots, L \quad (2\text{-}1)$$

Wherein a null hypothesis $H_0$ and an alternative hypothesis $H_1$ respectively correspond to the cases where the eigenvalue of the autocorrelation matrix is equal to the eigenvalue of the covariance matrix, and the eigenvalue of the autocorrelation matrix is greater than the eigenvalue of the covariance matrix. In other words, if the alternative hypothesis $H_1$ holds (that is, the null hypothesis $H_0$ does not hold), it means that there is a definite hyperspectral signal that affects the first-order statistic expressed by the eigenvalue of the autocorrelation matrix $R_{L \times L}$, making its eigenvalue larger than the eigenvalue of the covariance matrix $K_{L \times L}$; if the component contains only noise, the eigenvalue of its autocorrelation matrix $R_{L \times L}$ is equal to the eigenvalue of the covariance matrix $K_{L \times L}$. That is, a signal spectrum will change a spectral mean vector, and the vector is non-zero in $R_{L \times L}$, but 0 in $K_{L \times L}$.

Then, using the Neyman-Person detector $\delta^{NP}(l)$, for a binary hypothesis $\hat{\lambda}_l - \lambda_l$ defined by formula (2-1), assuming that its determined false alarm rate $P_F$ is a, to find a maximized detection capability $P_D$ of a threshold value $\tau_l$ in the following formula (2-2) of random decision rule.

$$\delta^{NP}(z_l) = \begin{cases} 1; & \text{if } \Lambda(z_l) > \tau_l \\ 1 & \text{with probability } \kappa; \text{ if } \Lambda(z_l) = \tau_l \\ 0; & \text{if } \Lambda(z_l) < \tau_l \end{cases} \quad (2\text{-}2)$$

Wherein, $\Lambda(z_l)$ is defined as $(z_l)=p_1(z_l)/p_0(z_l)$, $p_0(z_l)$ and $p_1(z_l)$ can be obtained by formula (2-1).

Finally, a VD value in the following formula (2-3) is obtained according to formula (2-2).

$$VD_{HFC}^{NP}(P_F) = \Sigma_{l=1}^{L} \lfloor \delta^{NP}(z_l) \rfloor \quad (2\text{-}3)$$

Wherein, $P_F$ is a pre-defined threshold value, when $\delta^{NP}(z_l)=1$, $\lfloor \delta(z_l) \rfloor=1$; when $\delta^{NP}(z_l)=1$, $\lfloor \delta(z_l) \rfloor=0$. In addition, when the number L of the spectral bands is between the VD value and 2VD value, better algorithm and analysis results can be obtained.

"Full band analysis method" disclosed in the invention refers to directly computing all the spectral bands to obtain characteristic bands.

"Averaging method" disclosed in the invention directly averages all spectral profiles to be measured (for example, the 256 spectral bands included in near-infrared rays) with statistical uniform distribution after the number L of the spectral bands is determined in the virtual dimensions to obtain average bands.

"Band Selection" (BS) disclosed in the invention refers to eliminating highly correlated sections in the spectral profiles to be measured and the standard spectral profiles through an algorithm, reducing computational burden and improving data accuracy, algorithms that can be used include band prioritization (BP) or/and band decorrelation (BD) to pick out spectral bands suitable for predetermined disease analysis, and then make into a hyperspectral imaging device for subsequent comparative analysis. Correlation of the band selection is calculated as follows:

$$\Omega^*_{BS} = \arg\{\max/\min_{\Omega_{BS}}(4) \subset \Omega, |\Omega_{BS}|=n_{BS} J(\Omega_{BS})\} \quad (4)$$

Wherein, $\Omega_{BS}$ is a set of the number of the selected bands, $J(\cdot)$ is an optimized band selection objective function, $n_{BS}$ is the number of the selected bands, and $\Omega^*_{BS}$ is a sub-set of optimized bands.

The "band prioritization" disclosed in the invention selects a specific band prioritization criterion (BPC), and provides a priority score according to information importance of each of the bands. All the bands are then sorted according to their priority scores calculated by the band prioritization criterion. With these priority scores, bands can be simply added or removed to suit the $n_{BS}$ value (the number of the selected bands), and adjustments can be made at any time without requiring to recalculate band selection for the hyperspectral image.

Then, one of the following disclosed formulas (5-1) to (5-5) can be used to calculate variance, skewness, kurtosis, entropy or information divergence (ID) of different spectral bands respectively for using as a priority score of the spectral band, wherein, $B_j$ is a $j^{th}$ spectral band, $\zeta_j$ is a random variable used to calculate characteristics of the $j^{th}$ spectral band.

Calculating a variance of the random variable $\zeta_j$:

$$\text{var}(B_j)=\sigma_j^2 \quad (5\text{-}1)$$

Wherein, $\sigma$ is a standard deviation.

Skewness: calculate a third-order statistic of the random variable $\zeta_j$:

$$\text{skewness}(B_j)=[K_j^3]^2 \quad (5\text{-}2)$$

Wherein, $K_j^3=E[\zeta_j^3]=(1/MN)\Sigma_{n=1}^{MN}(z_n^j)^3$ calculates a sample mean of third-order statistic of the $j^{th}$ spectral band $B_j$.

Kurtosis: calculate a fourth-order statistic of the random variable $\zeta_j$:

$$\text{kurtosis}(B_j)=[K_j^4]^2 \quad (5\text{-}3)$$

Wherein, $K_j^4=E[\zeta_j^4]=(1/MN)\Sigma_{n=1}^{MN}(z_n^j)^4$ calculates a sample mean of fourth-order statistic of the $j^{th}$ spectral band $B_j$.

Entropy: calculate a chaos of the random variable $\zeta_j$:

$$\text{entropy}(B_j)=-\Sigma_{j=1}^{MN} p_{ji} \log p_j \quad (5\text{-}4)$$

Wherein, $p_j=(p_{j1}, p_{j2}, \ldots p_{jMN})^T$ calculates a probability distribution of an image histogram of the $j^{th}$ spectral band $B_j$.

Information divergence (ID): calculate a degree of non-Gaussianization of the band.

$$ID(B_j)=D(p_j; g_j)=\Sigma_{i=1}^{N} p_{ji} \log(p_{ji}/g_{ji}) + \Sigma_{i=1}^{N} g_{ji} \log(g_{ji}/p_{ji}) \quad (5\text{-}5)$$

Wherein, $p_j=(p_{j1}, p_{j2}, p_{j3}, \ldots p_{jN})^T$ calculates a probability distribution of an image histogram of the $j^{th}$ spectral band $B_j \cdot g_j=(g_{j1}, g_{j2}, g_{j3}, \ldots g_{jN})^T$ calculates mean value and variance of a Gaussian distribution of the $j^{th}$ spectral band $B_j$.

The "band decorrelation" disclosed in the invention converts a band image into a band vector, and a correlation between two band images can be explained by a correlation between two vectors. In one embodiment of the invention, the spectral angle mapper (SAM) and the spectral information divergence (SID) are used to realize steps of band decorrelation. Specific computing steps are as follows:

step 1: making $\{B_l\}_{l=1}^{L}$ a total set of bands to be decorrelated, $b_l$ representing a band vector of a lth band image $B_l$, $\Omega_L=\{b_l\}_{l=1}^{L}$ being a total set of band vectors;

step 2: setting $k=1$, $\Omega_k=\{b_l\}_{l=1}^{n_1}$, and $n_1=1$;

step 3: in a kth iteration, computing correlations of all the bands $b_l$ in $\Omega_L - \Omega_k$;

$$BD(b_l, b_k) \quad (6)$$

wherein, $BD(b_l, b_k)$ is used to measure a band correlation between the band image $B_l$ and the band image $B_k$;

and BD can be any calculation method of spectral vector signal, meaning that BD in formula (6) is set as SID, which can be defined as $BD(b_l, b_k)=SID(b_l, b_k)$ and a spectral vector correlation between $b_l$ and $b_k$ is calculated by SID;

step 4: if $BD(b_l, b_k) > \varepsilon$, then $_{k+1}=\Omega_k \cup \{b_l\}$ and check $k=L$, otherwise continuing to execute, and $\Omega_{k+1}=\Omega_k$ and $k \leftarrow k+1$, and then executing step 3; and step 5: setting the final result $\Omega_k$ of iteration to be $\Omega_{BD}$ to represent a final set after decorrelation, wherein correlations between all the bands in $\Omega_{BD}$ must be greater than $\varepsilon$.

The "abundance scorer" disclosed in the invention is a hyperspectral image algorithm, which can mainly calculate brightness and/or vector of each pixel in an image, including spectral matched filter (SMF), adaptive cosine estimator (ACE), constrained energy minimization (CEM) or spectral decorrelation energy minimization.

The "spectral decorrelation energy minimization" disclosed in the invention is an improvement of the constrained energy minimization. A main principle lies in taking a pixel value in a set of L-dimensional hyperspectral image sequence to obtain a set of L-dimensional vector according to a coordinate position of the pixel, and a set of L-dimensional solution can be obtained from this set of vector. An inner product of this set of solution and the vector of the input coordinate will make an output value equal to 1, and try to suppress other vectors and the value obtained from the inner product of this set of solution. Therefore, if it is similar to the vector of the input coordinate, the output value will be quite close to 1. In grayscale images, a brightness of a target region is highlighted and non-target regions are suppressed.

Making L a dimension of spectral bands, so an $i^{th}$ image vector is $r_i=(r_{i1}, r_{i2}, \ldots, r_{iL})^T$, $r_{ij}$ represents the $j^{th}$ spectral band of the $i^{th}$ pixel vector, $\{r_1, r_2, \ldots, r_N\}$ is a set of hyperspectral image sequence of all pixels in the image, and N is a total number of pixels in the image. Setting a spectrum of a target of interest as d, and designing an L-dimensional FIR linear filter $w=(w_1, w_2, \ldots, w_L)^T$ for the target, assuming that $y_i$ is an output result of a pixel spectrum $(r_i)$ of an $i^{th}$ spectral image passing through a designed FIR filter, written as $$y_i = \sum_{l}^{L} w_l r_{il} = w^T r_i = r_i^T w \tag{7}$$

Calculate an average energy result of all pixels:

$$\frac{1}{N}\left[\sum_{i=1}^{N} y_i^2\right] = \frac{1}{N}\left[\sum_{i=1}^{N}(r_i^T w)^T r_i^T w\right] = w^T\left(\frac{1}{N}\left[\sum_{i=1}^{N} r_i r_r^T\right]\right)w = w^T R_{L*L} w \tag{5}$$

Wherein it can be known that $$R_{L*L} = \frac{1}{N}\left[\sum_{i=1}^{N} r_i r_i^T\right]$$

is in the form of a matrix autocorrelation, so the CEM filter solves the following linear constrained optimization problem:

$$\min\{w^T R_{L*L} w\} \text{ subject to } d^T w = 1 \tag{8}$$

A solution of formula (8) is:

$$w^* = \frac{R_{L*L}^{-1} d}{d^T R_{L*L} d} \tag{9}$$

In order to obtain a severity of a disease, an autocorrelation matrix $R_{L\times L}$ in formula (9) is slightly improved, and all known standard spectral profiles are included in computation of the autocorrelation matrix, rather than only a single case, which is used as a criterion for comparison, and for computing of an abundance image.

It can be known from the above that the CEM filter can detect $\delta^{CEM}(r)$, when the pixel vector r=d on the hyperspectral image cube, $\delta^{CEM}(d)=1$, which satisfies formula (8). Wherein a value of $\delta^{CEM}(r)$ is obtained from the pixel d to be detected that is contained in the image pixel r. Accordingly, the abundance image is calculated from the CEM filter, and an abundance score of the CEM is normalized by the following formula (10) to calculate a quantitative abundance score representing the severity of the disease for subsequent quantitative analysis.

$$\delta^{CEM}_{normalized}(r) = \frac{\delta^{CEM}(r) - \min(\delta^{CEM}(r))}{\max(\delta^{CEM}(r)) - \min(\delta^{CEM}(r))} \tag{10}$$

Further, if a hyperspectral image region of normal skin is used as a coordinate of interest, this set of solution can be regarded as a filter so that each of the pixel vectors of the hyperspectral image sequence is brought into computation in sequence to complete detection of normal regions and suppress a brightness of other abnormal regions, so as to achieve detection of target with or without disease, and then calculate a disease severity (abundance score). The greater the abundance score, the more normal the region, and the smaller the score, the more abnormal the region.

If a hyperspectral image region of the most severe level of a predetermined disease (such as diabetes, scleroderma and rheumatoid arthritis) is used as a coordinate of interest, this set of solution can be regarded as a filter so that each of the pixel vectors of the hyperspectral image sequence is brought into computation in sequence to highlight regions with pathological changes and suppress a brightness of other normal regions, and then detect diseased targets. The greater the abundance score, the more abnormal the region, and the smaller the score, the more normal the region.

"Electrochemical skin conductance (ESC)" test disclosed in the invention mainly calculates a chloride concentration in sweat through reverse iontophoresis and chronoamperometry in order to accurately assess sweat gland functions of a subject. Wherein, a detection instrument used in the electrochemical skin conductance test has two sets of large-area stainless steel electrodes, which are used to measure a conductance measurement value of the subject's hands and feet respectively. The conductance measurement value represents a ratio of a current produced to a constant direct voltage DC stimulation (≤4V) applied to the electrodes, and microSiemens (μS) is used as a unit, finally, the conductance measurement value is transferred to a computer for records and data management.

In addition, criteria for judging whether the subject has kineto-dysfunction in the feet is: the conductance measurement value greater than 6 μS representing no dysfunction; the conductance measurement value 4 μS to 6 μS representing moderate dysfunction; the conductance measurement value less than 4 μS representing severe dysfunction. Accordingly, for diabetics, the invention uses the conductance measurement value greater than 6 μS to indicate normal foot nerve function, and the conductance measurement value less than or equal to 6 μS to indicate abnormal foot nerve function as a basis for grouping.

"Modified Rodnan skin score (mRSS)" disclosed in the invention divides a human body into 17 common skin parts, such as upper arm, forearm, hand, finger, calf, foot, abdomen, etc. Based on the skin score table, a clinician palpates the skin of these parts to respectively determine a skin score, or mRSS score, after determination and the scores are summed up to serve as a basis for clinical diagnosis results.

"Ultrasonic skin thickness detection" disclosed in the invention uses an ultrasonic instrument, i.e., Philips iu22 (Philips Ultrasound, Bothell WA, USA) with a 4 MHz-10 MHz or 15 MHz linear probe to scan and obtain ultrasound images of target regions with pathological changes, such as volar sides of the bilateral forearms and backs of the hands of the selected subject, and to measure a skin thickness in the images.

In one embodiment of the invention, a hyperspectral characteristic band selection method is disclosed, which mainly comprises following steps of:

step A: using a virtual dimension algorithm to calculate a number of endmembers of a hyperspectral image of a predetermined disease, and using between 1 time and 2 times the number of the endmembers as a number of predetermined selected bands, the number being defined as n, and n being a non-zero natural number;

the predetermined disease can be, but is not limited to, diabetes, scleroderma or rheumatoid arthritis, wherein, the predetermined disease is scleroderma, the number of the selected bands is preferably 1.5 times the number of the endmembers; the predetermined disease is diabetes, the number of the selected bands is preferably 1 time or 1.5 times the number of the endmembers;

step B: obtaining a plurality of spectral bands from the hyperspectral image, and selecting n characteristic bands with a number matching the number of the selected bands from the spectral bands;

wherein the method for selecting the characteristic bands can be, but is not limited to, full band analysis method, averaging method, and band prioritization, in short, the full band analysis method computes all the spectral bands to obtain the characteristic bands;

the averaging method averages all the spectral bands with statistical uniform distribution, and the number of the selected bands equals to the number of the endmembers to obtain the characteristic bands;

the band prioritization calculates priority scores of all spectral bands, and uses the top n spectral bands with higher priority scores as characteristic spectra, wherein, variance, skewness, kurtosis, entropy or information divergence is selected to calculate the priority score of each of the spectral bands, in addition, when the characteristic bands are selected by the band prioritization, the number of the selected bands is preferably 1.5 times the number of the endmembers; and step C: compiling statistics of repetition times of the same characteristic bands selected by full band analysis method, averaging method and band prioritization respectively, and using the characteristic bands with repetition times reaching a predetermined threshold value as the preferred characteristic spectra.

With composition of the above steps, the hyperspectral characteristic band selection method disclosed in the invention is capable of selecting characteristic bands of a predetermined disease in order to achieve objects of simplifying an amount of data and simplifying the steps of hyperspectral image analysis.

In order to further illustrate the technical features of the invention and the efficacies that can be achieved, several examples and diagrams are provided for detailed description as follows.

First of all, in order to clearly distinguish the band selection methods used in the invention, the names of these methods are redefined, that is, the full band analysis method is a first band selection method, the averaging method is a second band selection method, and the band prioritization is further classified into a third band selection method, a fourth band selection method, a fifth band selection method, a sixth band selection method, and a seventh band selection method according to different band sorting criteria, namely variance, skewness, kurtosis, entropy and information divergence.

Example 1

Diabetes Detection and Analysis

As shown in FIG. 1, the diabetes detection analysis mainly comprises following steps of.

step 101: recruiting subjects

Taichung Veterans General Hospital in Taiwan recruits 176 diabetics and 20 healthy individuals;

step 102: detecting electrochemical skin conductance the subjects are tested for electrochemical skin conductance and are grouped according to test results, as shown in Table 1 below:

TABLE 1

Figure 2:
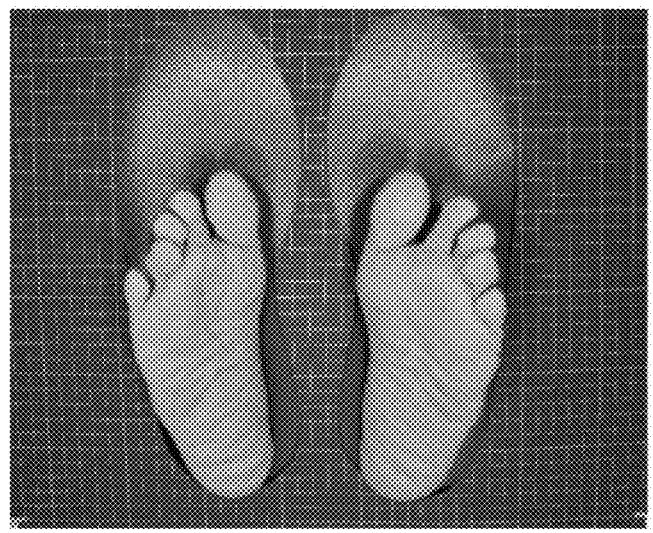
FIG. 2 is a schematic diagram of a general image of soles of a subject in example 1 of the invention.
Figure 3:
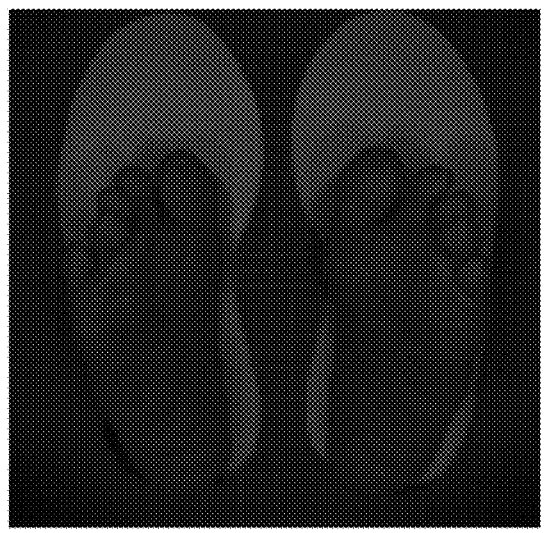
FIG. 3 is a schematic diagram of a hyperspectral image of the soles of the subject in example 1 of the invention.
Figure 4:
FIG. 4 is a mask image of the soles of the subject in example 1 of the invention.
Figure 5A:
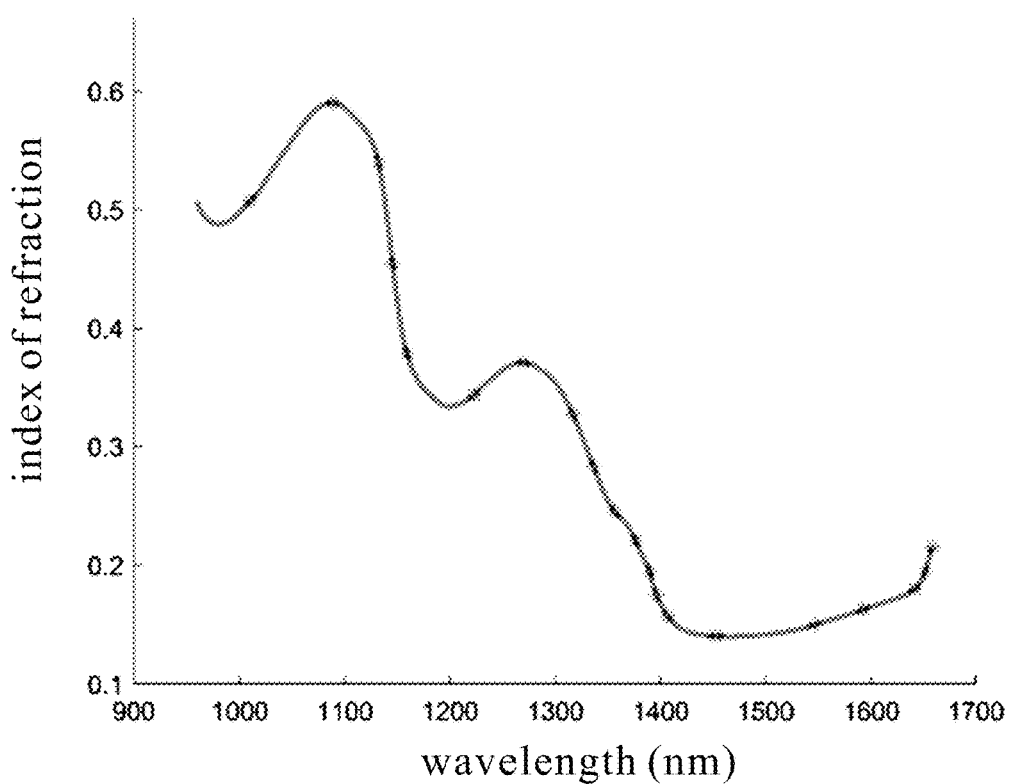
FIGS. 5A to 5D are respectively distribution diagrams of spectral bands selected by a third band selection method, a fourth band selection method, a fifth band selection method and a sixth band selection method in example 1 of the invention, and spectral wavelength positions of the selected bands are respectively marked.
Figure 5B:
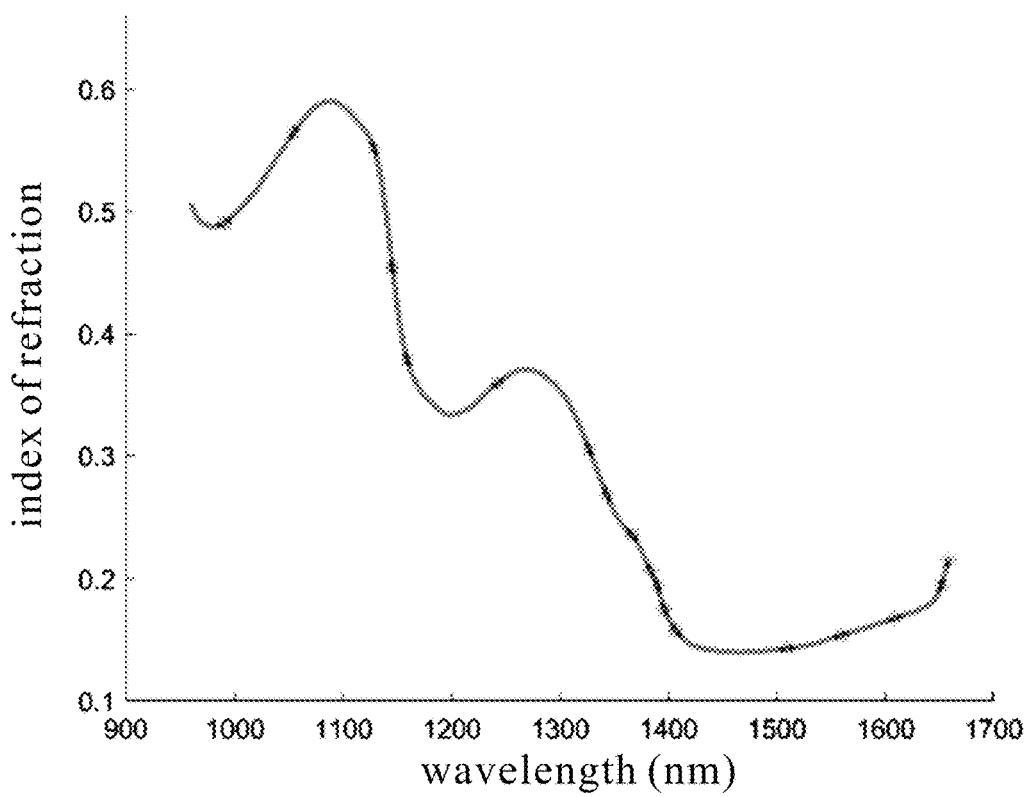
Figure 5C:
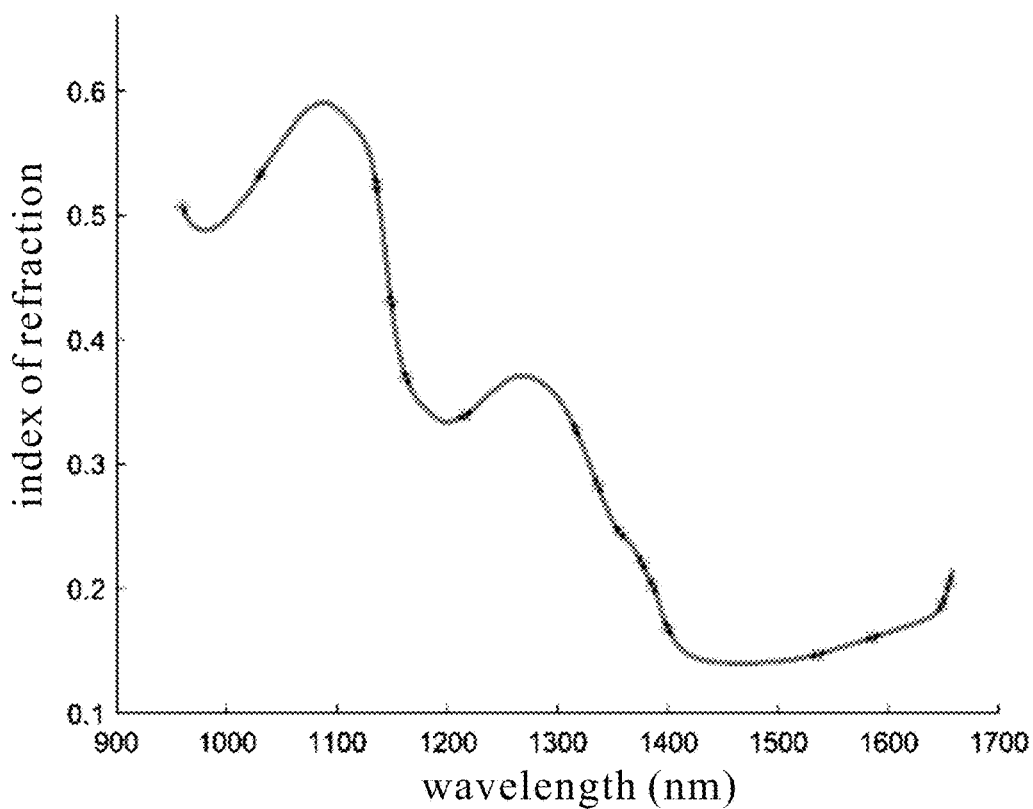
Figure 5D:
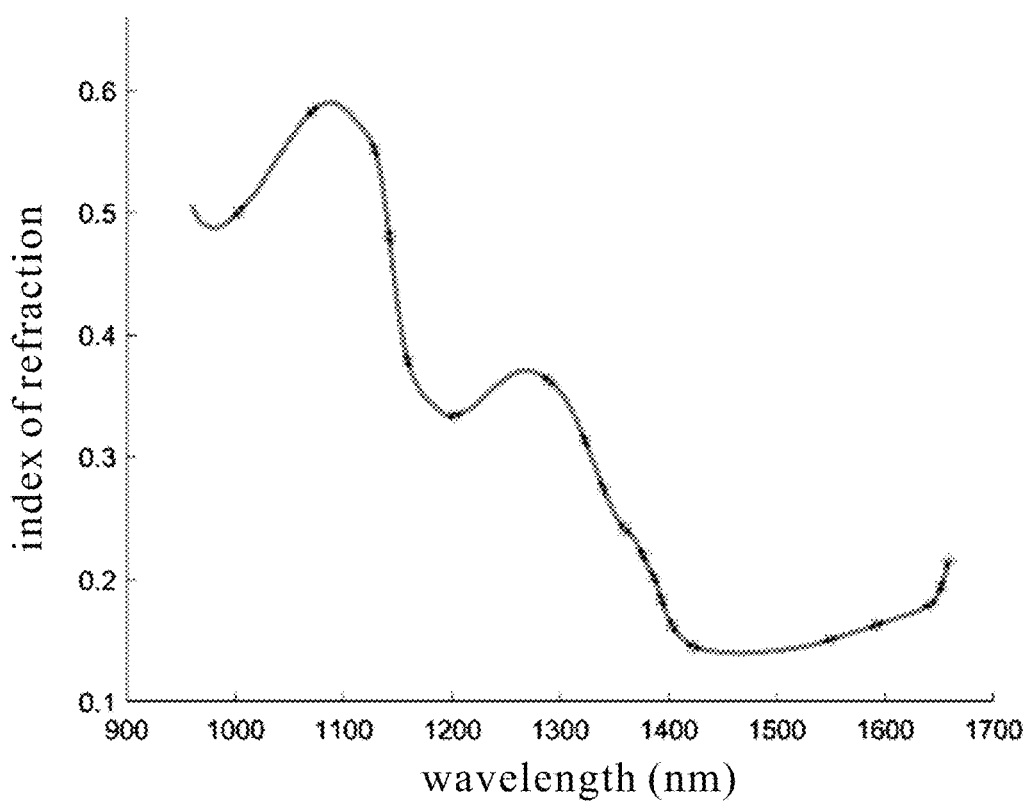

| basic information of the subjects | | | |
|---|---|---|---|
| | ESC <= 60 μS (Neural dysfunction) | ESC > 60 μS (Normal neural function) | Normal subject |
| Number of people (male/female) | 97 (60/37) | 79 (44/35) | 20(9/11) |
| Average age | 59.40 ± 13.61 | 54.79 ± 19.81 | 33.46 ± 8.21 | step 103: obtaining hyperspectral image information photographing hyperspectral images of skin of feet of each of the subjects, and performing image preprocessing respectively;

for example, the image preprocessing method in this example uses two images of different bands to perform band ratio, and then uses morphology for processing conventional spatial images, combined with Otsu's method for calculating threshold values, foot regions in the hyperspectral image of each of the subjects can be taken out and made into a mask, wherein, as shown in FIG. 2 to FIG. 4, which respectively represent a general image and a hyperspectral image of soles of the subject, a mask image of regions of interest taken out subsequently, and the mask image can be used to automatically take out all pixels in the foot regions subsequently in order to perform hyperspectral image analysis;

then, the hyperspectral profile difference analysis method computes to establish corresponding spectral profiles respectively;

step 104: determining a number of endmembers the number of the endmembers (VD value) calculated by the virtual dimension algorithm is 14, and the number of the endmembers (VD value) is used as a number of predetermined bands, in particular, when selecting bands, it is not always possible to find a number of bands that exactly matches the number of the endmembers (VD value), so the number of the bands can be between VD and 2VD;

step 105: selecting bands as shown in Table 2 below, the band selection method adopted, the number of the bands and the characteristic bands selected are listed, in FIG. 5A to FIG. 5D, distribution diagrams of the bands selected by the different selection methods are shown, and spectral wavelength positions of the selected bands are respectively marked;

wherein, when the third band selection method, the fourth band selection method, the fifth band selection method and the sixth band selection method are used for band analysis respectively, the number of the bands is based on a value close to 1.5VD (at this time $P_F=10^{-4}$), and the second band selection method is based on 1VD for analysis;

TABLE 2 number of bands and selected bands determined by different band selection methods

| Band selection method | Number of bands | Band number sorting/Selected band sorting |
|---|---|---|
| Second band selection method | 14 | 31, 46, 61, 76, 91, 106, 121, 136, 151, 166, 181, 196, 211, 226 |
| Corresponding spectral wavelength (nm) | | 1061.3, 1111.9, 1162.4, 1212.8, 1263.1, 1313.3, 1363.4, 1413.3, 1463.2, 1513, 1562.7, 1612.3, 1661.7, 1711.1 |
| Third band selection method | 20 | 39, 52, 16, 56, 93, 60, 79, 107, 210, 113, 208, 148, 119, 205, 134, 129, 176, 131, 190, 125 |
| Corresponding spectral wavelength (nm) | | 1084.9, 1030.9, 986.9, 1138.8, 1263.1, 1253, 1232.9, 1202.7, 1196, 1651.8, 1456.6, 1453.3, 1446.6, 1483.2, 1356.7, 1489.8, 1406.7, 1370, 1579.2, 1532.9 |
| Fourth band selection method | 18 | 165, 210, 180, 208, 195, 134, 131, 129, 127, 122, 115, 110, 85, 29, 10, 60, 51, 56 |
| Corresponding spectral wavelength (nm) | | 1506.4, 1655.1, 1556.1, 1648.6, 1605.7, 1403.4, 1393.4, 1386.7, 1380, 1363.4, 1340, 1323.3, 1239.6, 1051.2, 986.9, 1155.7, 1125.4, 1142.2 |
| Fifth band selection method | 16 | 57, 1, 61, 53, 77, 107, 22, 113, 119, 173, 209, 188, 125, 207, 128, 132 |
| Corresponding spectral wavelength (nm) | | 1145.6, 956.4, 1159, 1132.1, 1212.8, 1313.3, 1027.5, 1333.3, 1353.4, 1532.9, 1651.8, 1582.5, 1373.4, 1645.3, 1383.4, 1396.7 |
| Sixth band selection method | 20 | 139, 133, 177, 130, 190, 34, 128, 205, 125, 14, 208, 210, 120, 114, 51, 109, 99, 73, 55, 60 |
| Corresponding spectral wavelength (nm) | | 1420, 1400, 1546.1, 1390, 1589.1, 1068, 1383.4, 1638.7, 1373.4, 1000.4, 1648.6, 1655.1, 1356.7, 1336.7, 1125.4, 1320, 1286.5, 1199.4, 1138.8, 1155.7 | it can be known from the above analysis results in Table 1 that, a number of characteristic bands selected by the different band selection methods is at least 14, however, if all the 14 spectral bands are included in a reference basis constructed by an active hyperspectral imaging device A, it is difficult to achieve the main object of the invention if a size of the device A cannot be further reduced;

therefore, taking production of hardware of capturing range into consideration, a number of occurrences of the characteristic bands selected by the different band selection methods is further counted, and the characteristic bands with the most occurrences selected by each of the methods are found, with results shown in Table 3:

TABLE 3 statistics of times of occurrence of the characteristic bands selected by the different band selection methods

| Times of occurrence of the selected characteristic bands | Bands ordered by spectral wavelength (nm) |
|---|---|
| Has occurred | 956.4, 959.8, 986.9, 1000.4, 1007.2, 1027.5, 1030.9, 1051.2, 1068, 1084.9, 1125.4, 1128.7, 1132.1, 1138.8, 1142.2, 1145.6, 1152.3, 1155.7, 1159, 1172.5, 1199.4, 1212.8, 1219.5, 1239.6, 1266.4, 1286.5, 1313.3, 1316.6, 1320, 1323.3, 1333.3, 1336.7, 1340, 1353.4, 1356.7, 1360, 1363.4, 1373.4, 1376.7, 1380, 1383.4, 1386.7, 1390, 1393.4, 1396.7, 1400, 1403.4, 1420, 1449.9, 1506.4, 1526.3, 1532.9, 1542.8, 1546.1, 1556.1, 1572.6, 1582.5, 1589.1, 1605.7, 1622.2, 1638.7, 1645.3, 1648.6, 1651.8, 1655.1 |
| Occurred twice | 1138.8, 1142.2, 1313.3, 1333.3, 1340, 1353.4, 1383.4, 1403.4, 1589.1, 1638.7, 1645.3, 1651.8 |
| Occurred three times | 1125.4, 1155.7, 1373.4, 1386.7, 1393.4, 1648.6, 1655.1 | according to the content of Table 3, among the characteristic bands selected by the different methods, the bands that occur 3 times repeatedly are 1125.4 nm, 1155.7 nm, 1373.4 nm, 1386.7 nm, 1393.4 nm, 1648.6 nm, 1655.1 nm sequentially, a total of 7 bands, however, taking the current short-wave infrared LED products, and factors of their prices and functions into consideration, 1100 nm, 1150 nm, 1200 nm, 1300 nm, 1450 nm, 1550 nm and 1650 nm are finally selected as wavelengths of a specific light source 20 of the active hyperspectral imaging device A; and step 106: verifying and comparing in order to verify calculation results of the different band selection methods, by using a hyperspectral imaging soft abundance scorer (HISAS) constructed by the spectral decorrelation energy minimization with known disease spectral bands and hyperspectral image information of the most severe level of diabetes as algorithmic criteria, each pixel vector in each of the spectral bands is computed in order to calculate abundance score or abundance map of the first band selection method, the second band selection method, the third band selection method, the fourth band selection method, the fifth band selection method, and the sixth band selection method, and a value of the abundance score can be used as a basis to judge whether there is diabetes.

Figure 6:
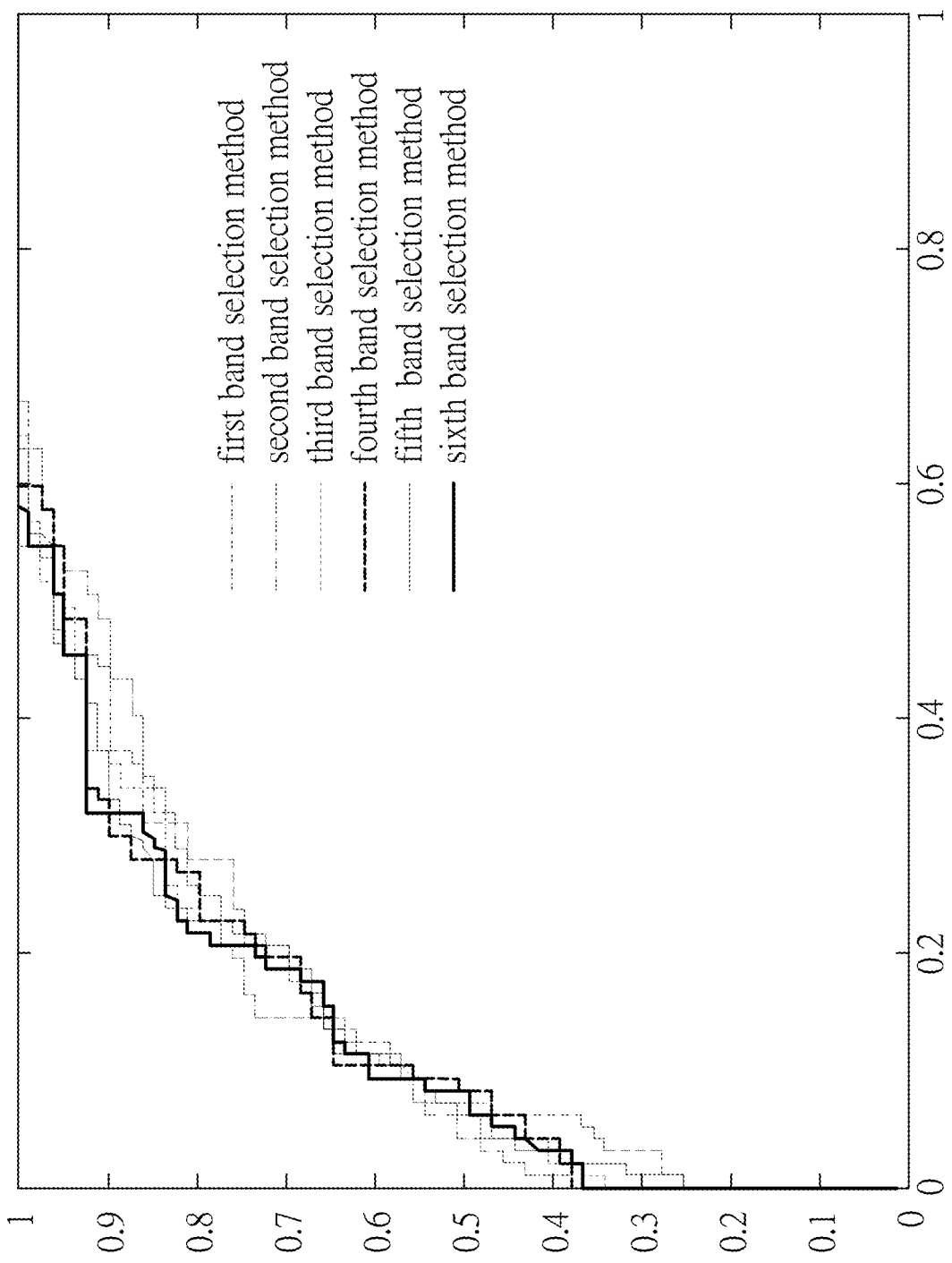
FIG. 6 is a graph of receiver operating characteristic (ROC) curves of different band selection methods in example 1 of the invention.

Then, receiver operating characteristic (ROC) curves are used to compare the abundance scores calculated by the methods. FIG. 6 shows a graph of the receiver operating characteristic (ROC) curves indicating whether there is diabetes determined by analysis results of the methods.

Then, areas under the ROC curves (AUC) of the methods are calculated separately, and an AUC value is used as a reference for diagnostic ability. Then, the AUC value of each of the methods is compared and verified with results of the electrochemical skin conductance test, that is, the conductance measurement value greater than 600 indicating normal foot nerve function, the conductance measurement value less than or equal to 600 indicating abnormal foot nerve function, and analysis results of correlations between each of the methods and the results of the electrochemical skin conductance test are shown in Table 4.

TABLE 4 correlations between each of the methods and the results of the electrochemical skin conductance test

| Band selection method | Number of analyzed bands | AUC ($P_D$, $P_F$) | Correlation with results of the electrochemical skin conductance test |
|---|---|---|---|
| First band selection method | 256 | 0.857 | 0.594 |
| Second band selection method | 14 | 0.866 | 0.579 |
| Third band selection method | 20 | 0.870 | 0.590 |
| Fourth band selection method | 18 | 0.871 | 0.580 |
| Fifth band selection method | 16 | 0.873 | 0.581 |
| Sixth band selection method | 20 | 0.876 | 0.581 |

It can be known from the above table that calculation results of the areas under the ROC curves of the first band selection method, the second band selection method, the third band selection method, the fourth band selection method, the fifth band selection method, and the sixth band selection method are respectively 0.857, 0.866, 0.870, 0.871, 0.873, and 0.876, among which, the sixth band selection method has the highest diagnostic ability, that is, the AUC value being 0.876. In addition, except the correlation between the second band selection method and the result of the electrochemical skin conductance test being 0.579, and the correlation between the fourth band selection method and the result of the electrochemical skin conductance test being equal to 0.58, the correlations between the other methods and the results of the electrochemical skin conductance test are all above 0.58.

Example 2

Detection and Analysis of Scleroderma

Figure 7:
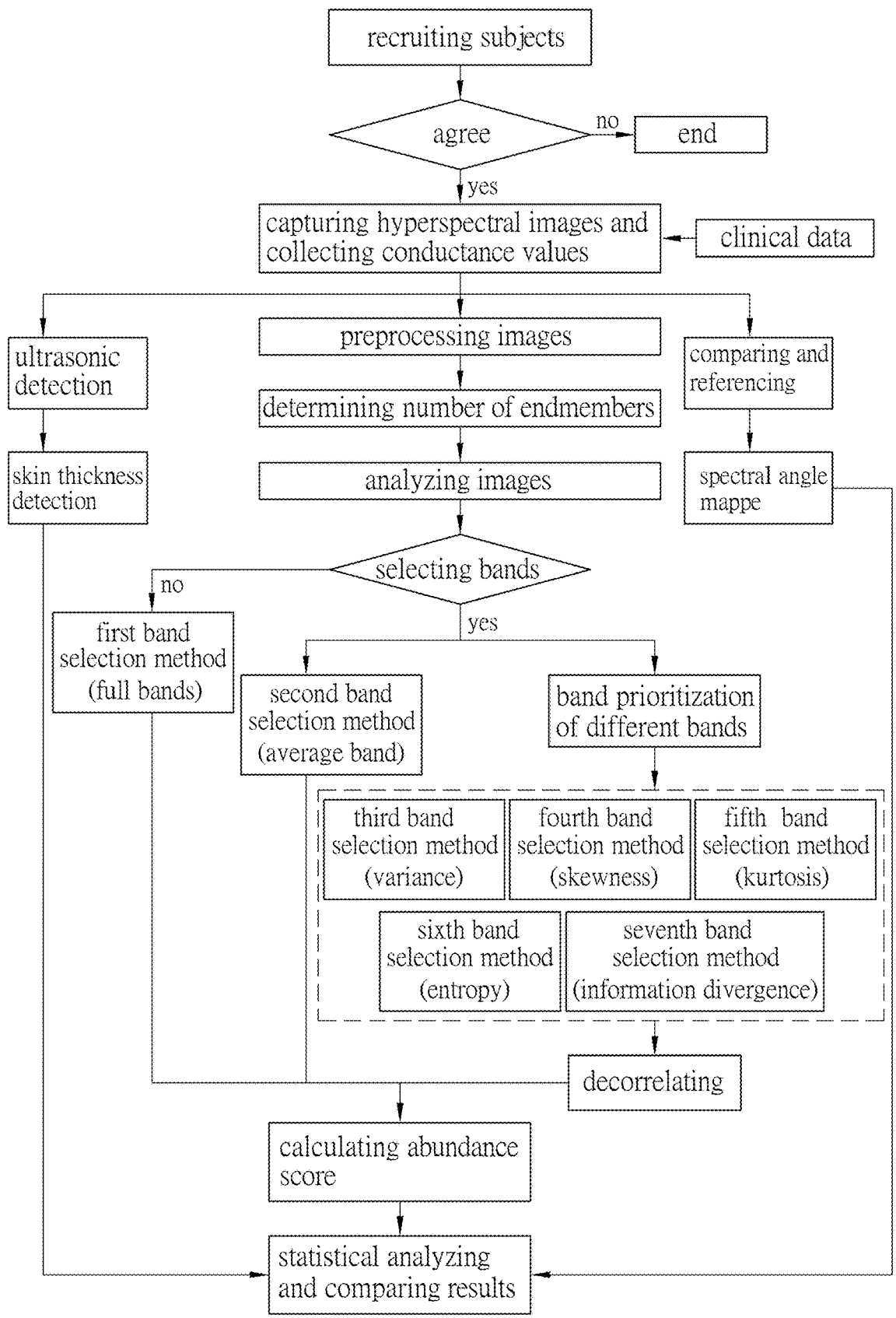
FIG. 7 is a schematic flowchart of example 2 of the invention.
Figure 8A:
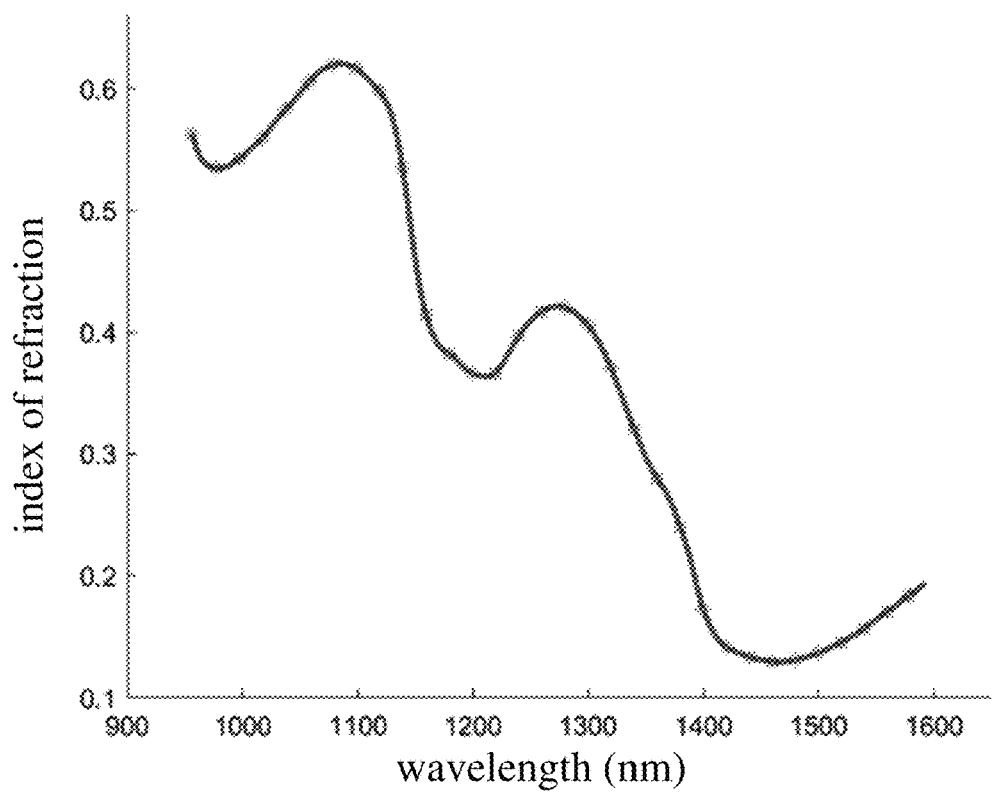
FIGS. 8A to 8F are respectively distribution diagrams of spectral bands selected by a first band selection method, a second band selection method, the third band selection method, the fourth band selection method, the fifth band selection method and the sixth band selection method in example 2 of the invention, and spectral wavelength positions of the selected bands are respectively marked.
Figure 8B:
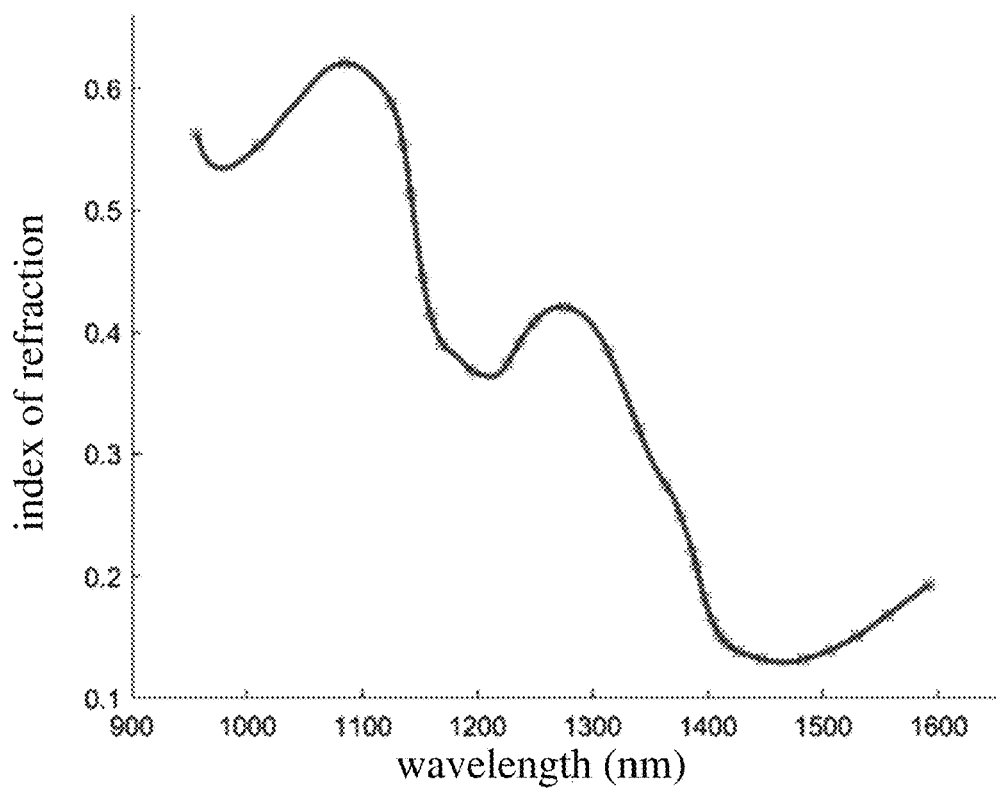
Figure 8C:
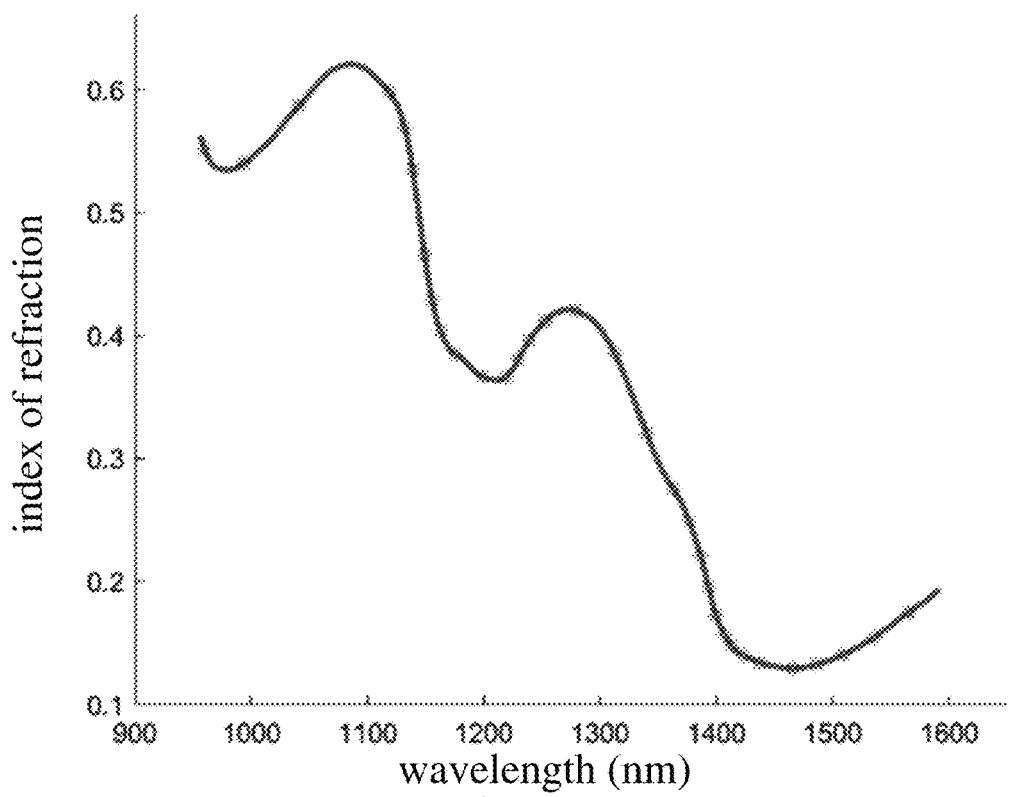
Figure 8D:
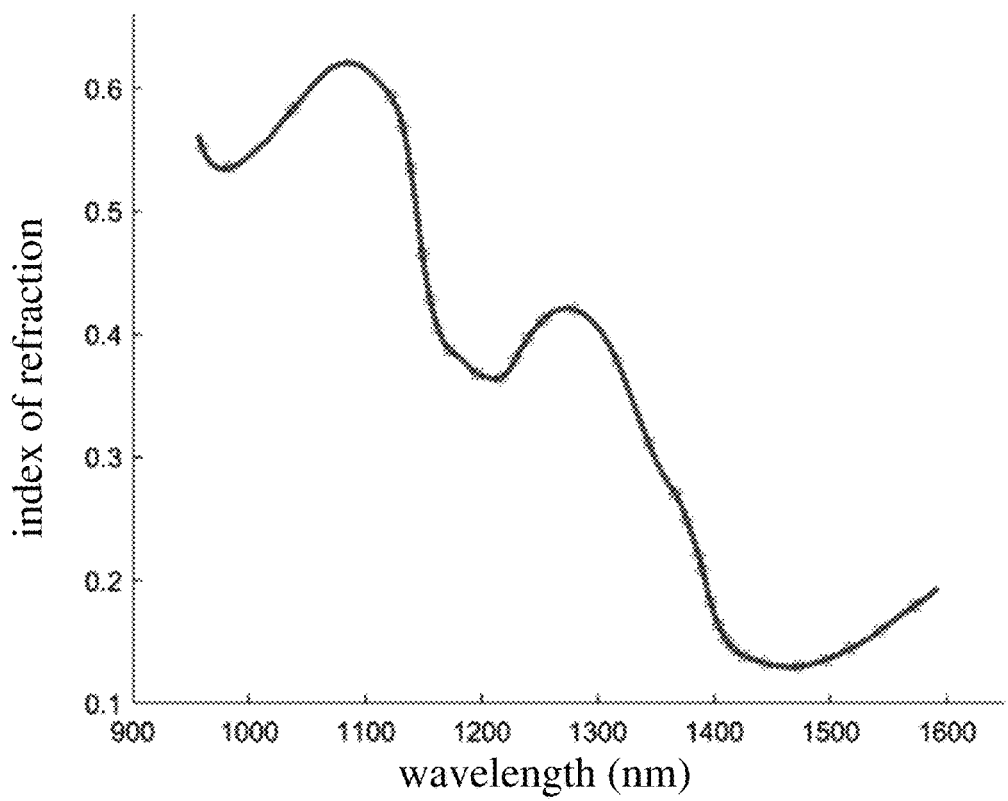
Figure 8E:
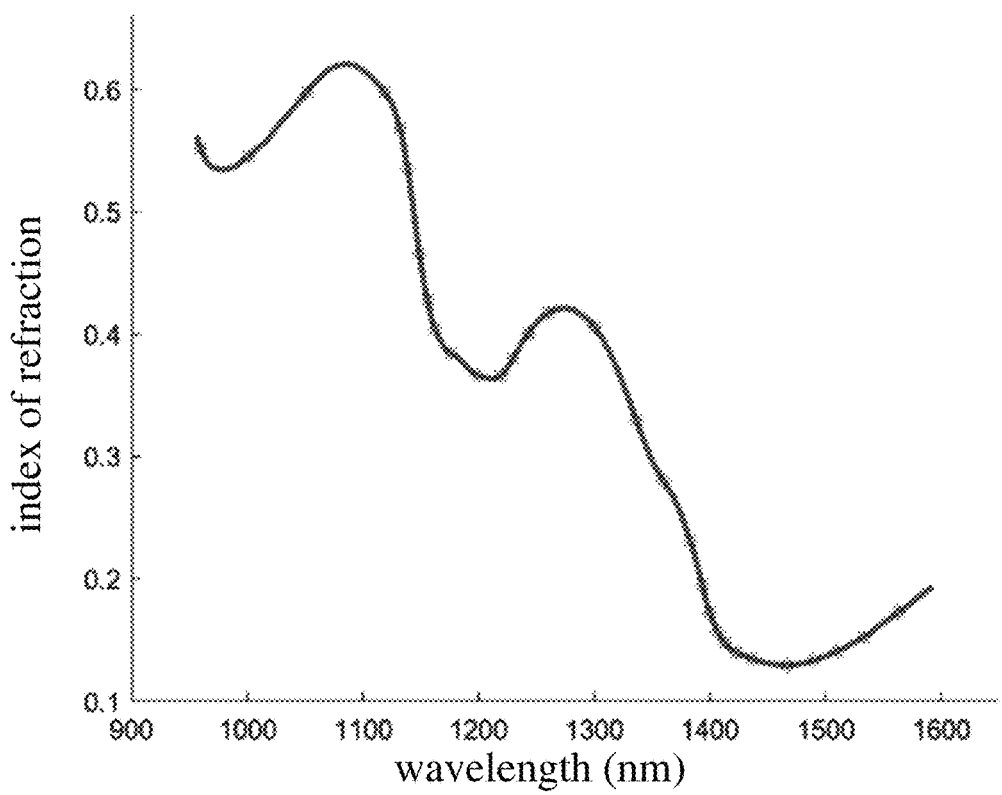
Figure 8F:
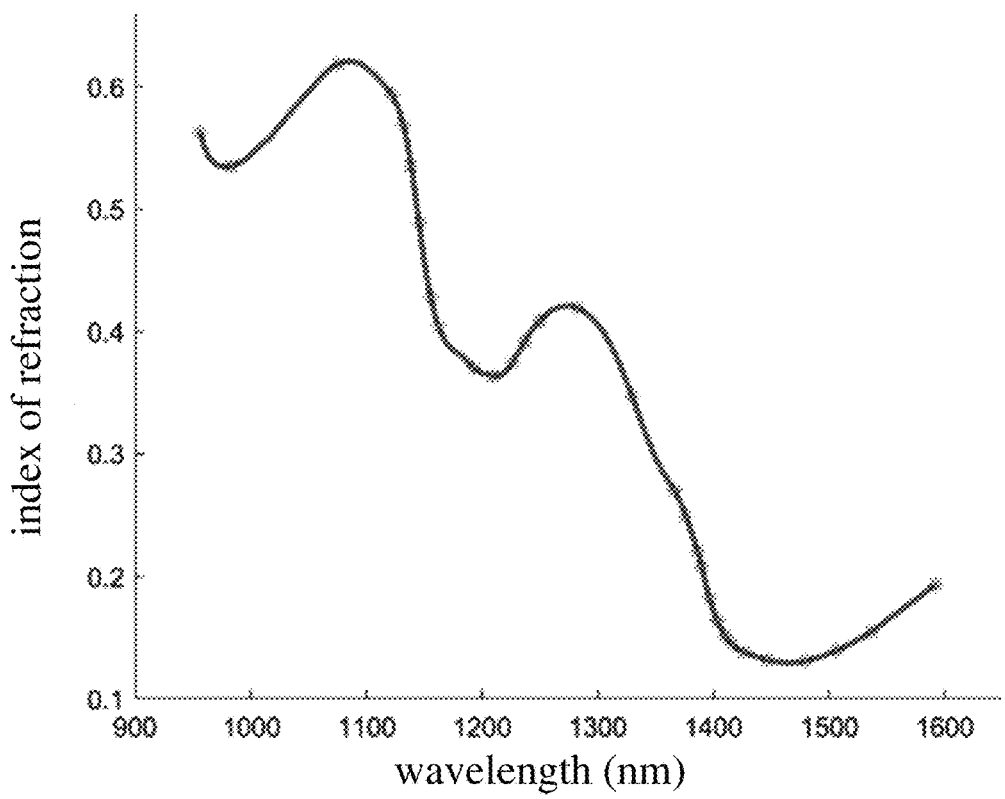

As shown in FIG. 7, main implementation steps of detection and analysis of scleroderma comprise:

step 201: recruiting subjects

Taichung Veterans General Hospital in Taiwan recruits 30 patients with scleroderma (average age 49.93±17.01, 10 males, 20 females) and 24 healthy individuals (average age 37.01±10.97, 12 males, 12 females), the conditions for patients with scleroderma include over the age of 20, and approved by the Institutional Review Board (IRB), with the human experiment research plan permit numbers CE16035B and CE16201A, the experiment is carried out after obtaining the consent of the subjects, and safety and privacy of the subjects are ensured;

step 202: calculating skin score and detecting skin thickness skin assessment scores of the subjects are diagnosed by a clinician with a skin score table, and skin thicknesses of the subjects are measured by an ultrasonic instrument for subsequent correlation analysis, and the data can be found in the contents of Table 1 and FIG. 1 in the paper "Hyperspectral imaging for skin assessment insystemic sclerosis: a pilot study" published by Yi-Ming Chen et al. in the journal Rheumatology in 2020;

wherein, this analysis and measurement method is a conventional technology, so the detailed information will not be described;

step 203: obtaining hyperspectral image information a hyperspectral imaging instrument is used to capture skin information of six different target regions on the subject's hands (i.e., 3 in the left hand and 3 in the right hand), and capturing time is about 10 minutes to obtain hyperspectral images;

step 204: determining a number of endmembers the number of the endmembers (VD value) of all the subjects' hyperspectral images calculated by the virtual dimension algorithm is 20, and the number of the endmembers (VD value) is used as a number of predetermined bands, in particular, when selecting bands, it is not always possible to find a number of bands that exactly matches the number of the endmembers (VD value), so the number of the bands can be between VD and 2VD;

step 205: selecting bands as shown in Table 4, the number of the bands determined by all the methods and the characteristic bands selected by the methods are listed, in FIG. 8A to FIG. 8F, distribution diagrams of the bands selected by the different selection methods are shown, and spectral wavelength positions of the selected bands are respectively marked;

wherein, when band selection is performed by average bands and the hyperspectral characteristic band selection method, the number of the bands is based on a value close to 1.5VD (at this time $P_F=10^{-4}$);

TABLE 5 the number of the bands determined by the different band selection methods and band numbers of the selected bands

Figure 9A:
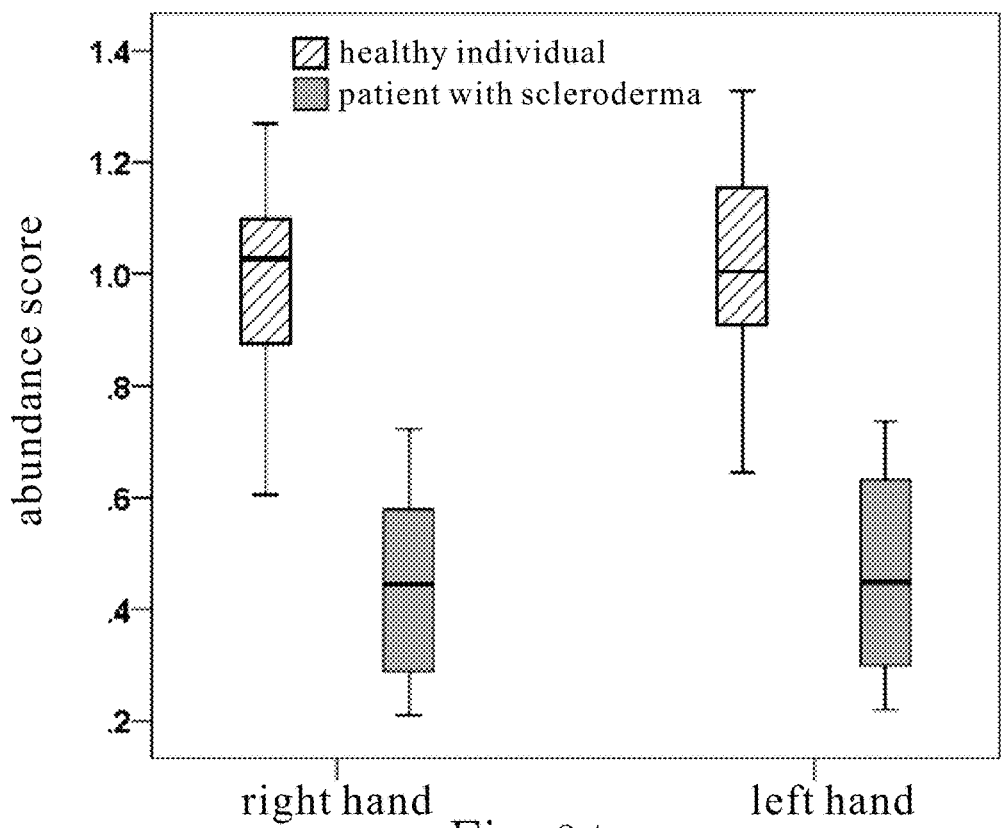
FIGS. 9A to 9G are respectively box plots of statistical analysis of computing results of the first band selection method, the second band selection method, the third band selection method, the fourth band selection method, the fifth band selection method, the sixth band selection method and a seventh band selection method in example 2 of the invention.
Figure 9B:
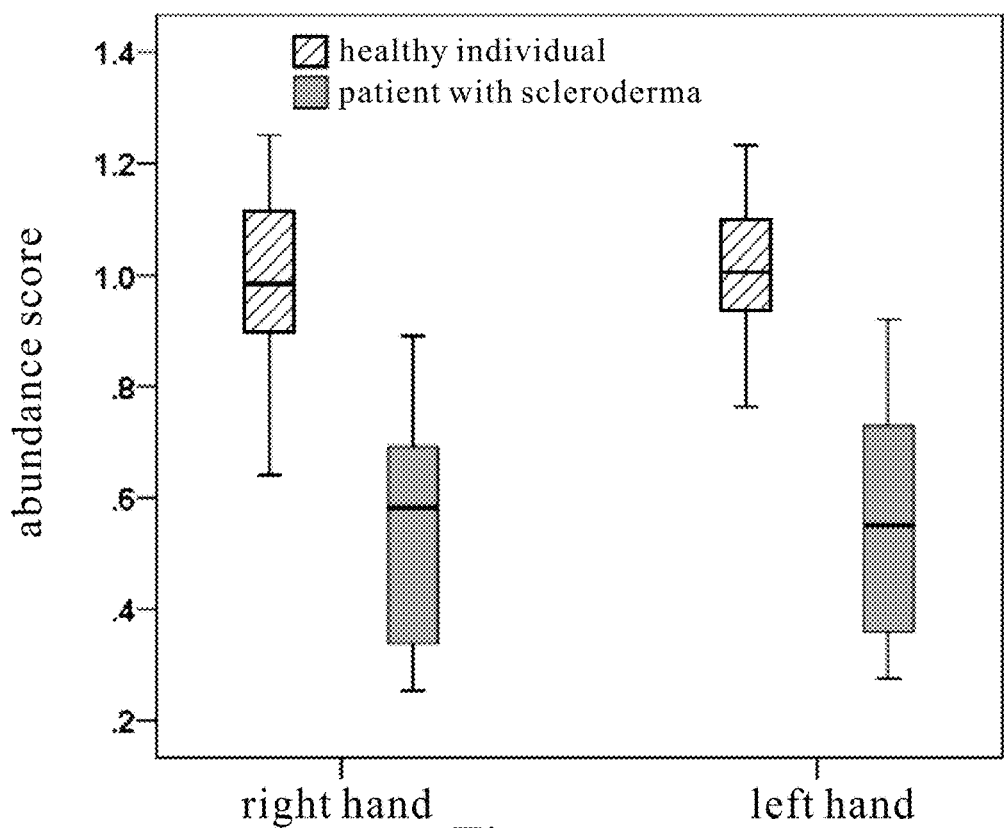
Figure 9C:
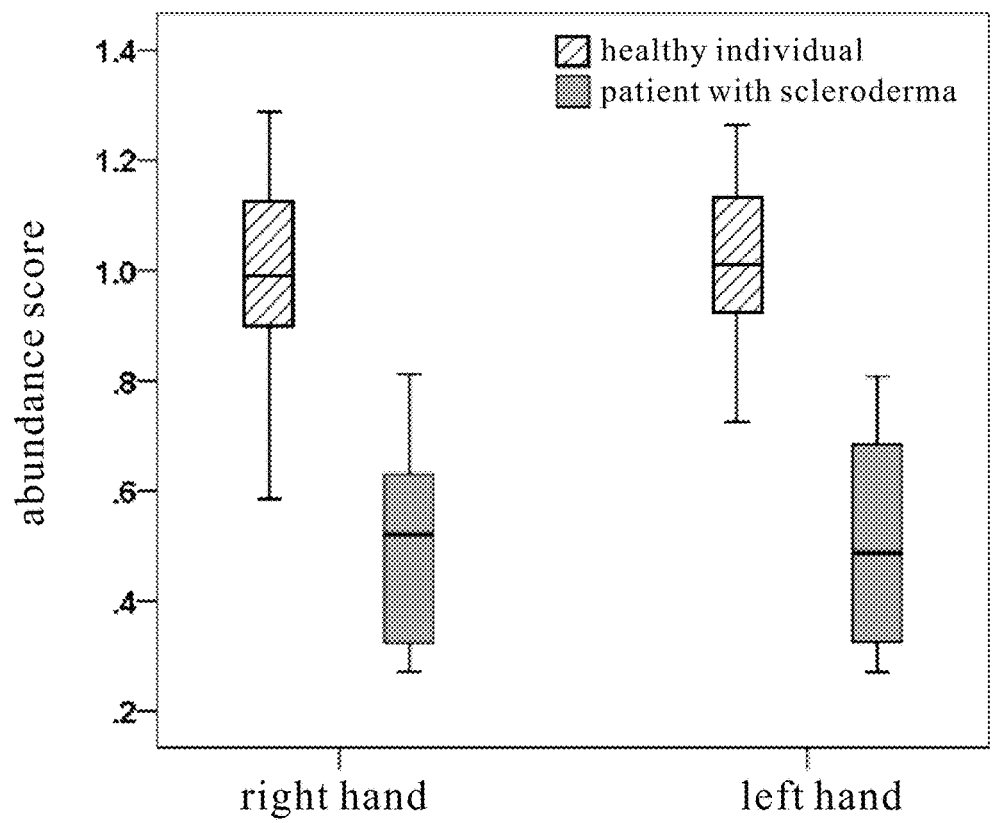
Figure 9D:
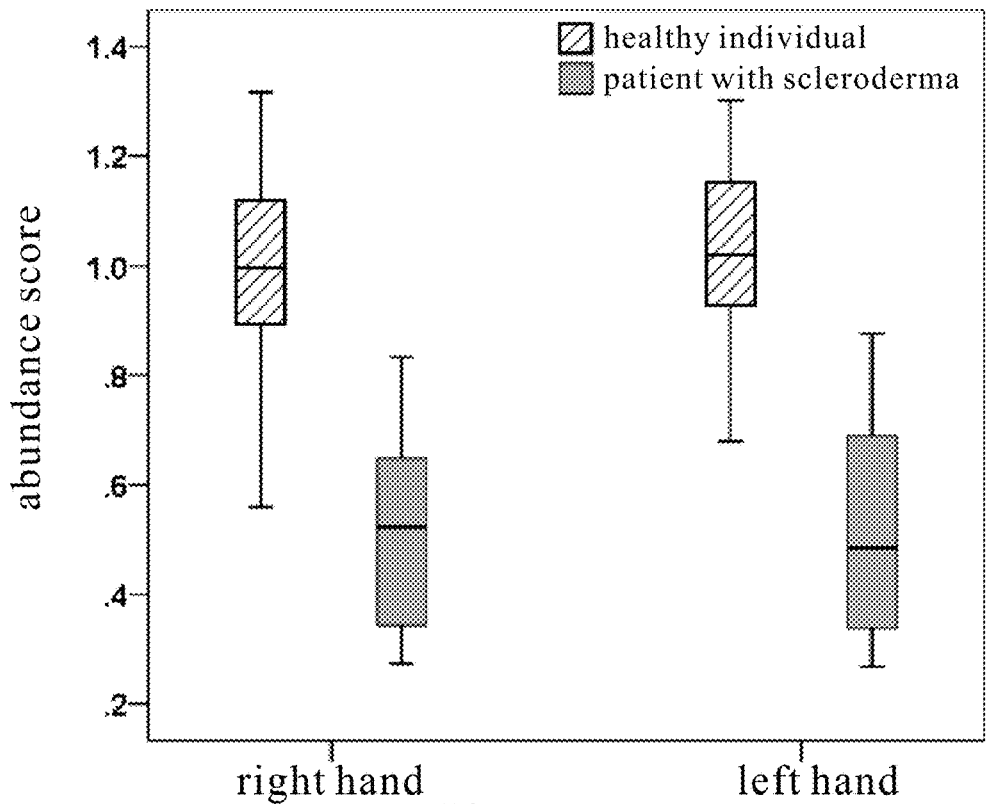
Figure 9E:
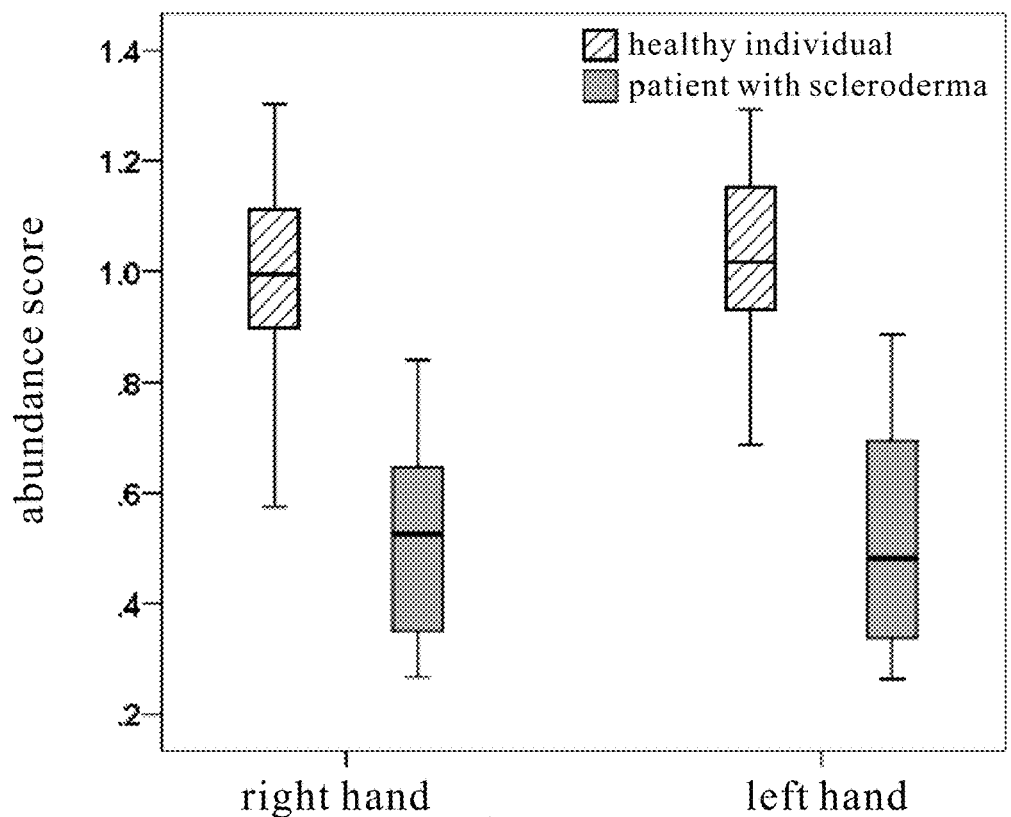
Figure 9F:
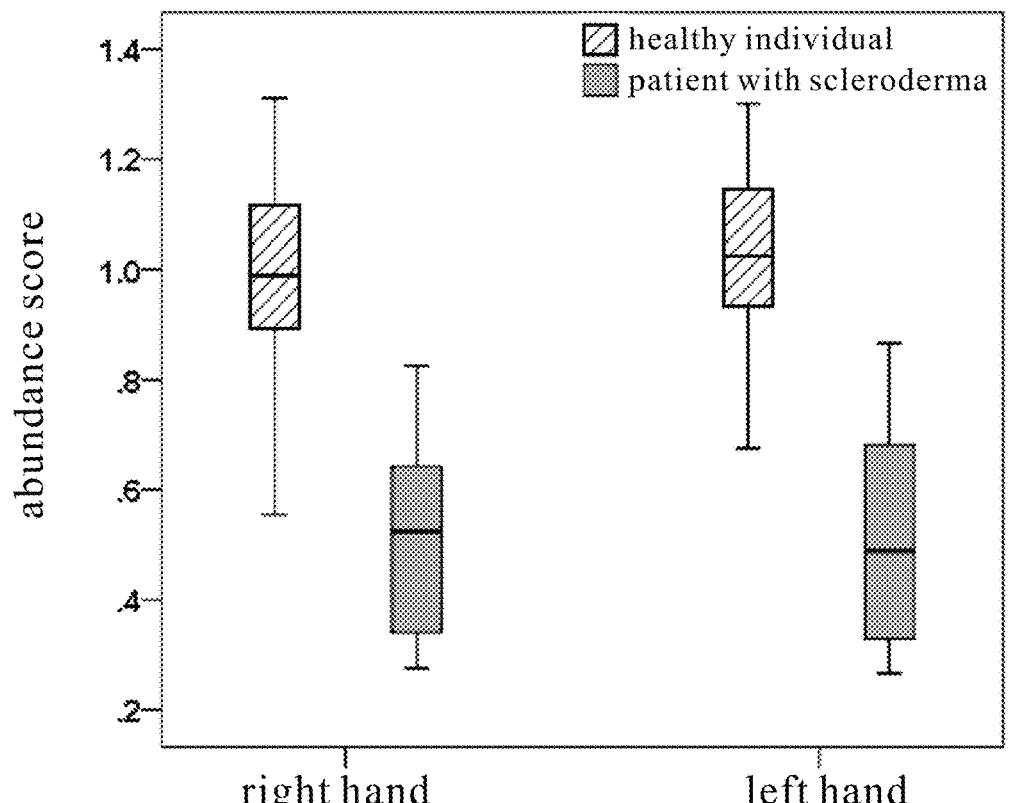
Figure 9G:
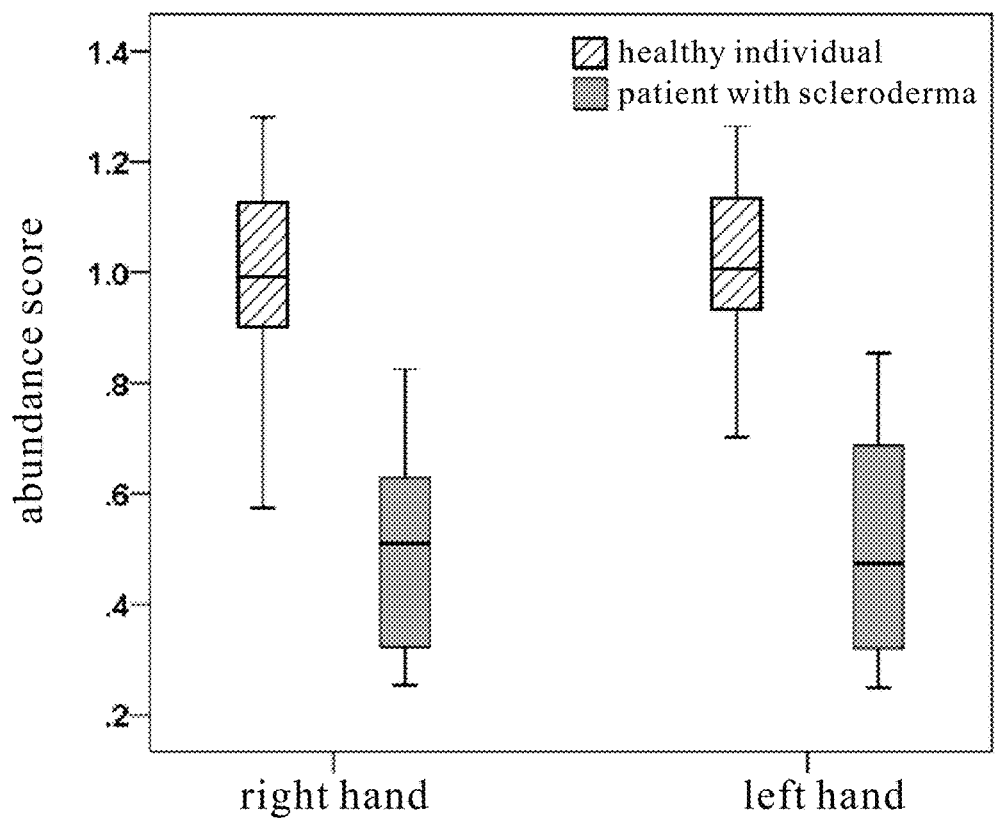
Figure 9H:
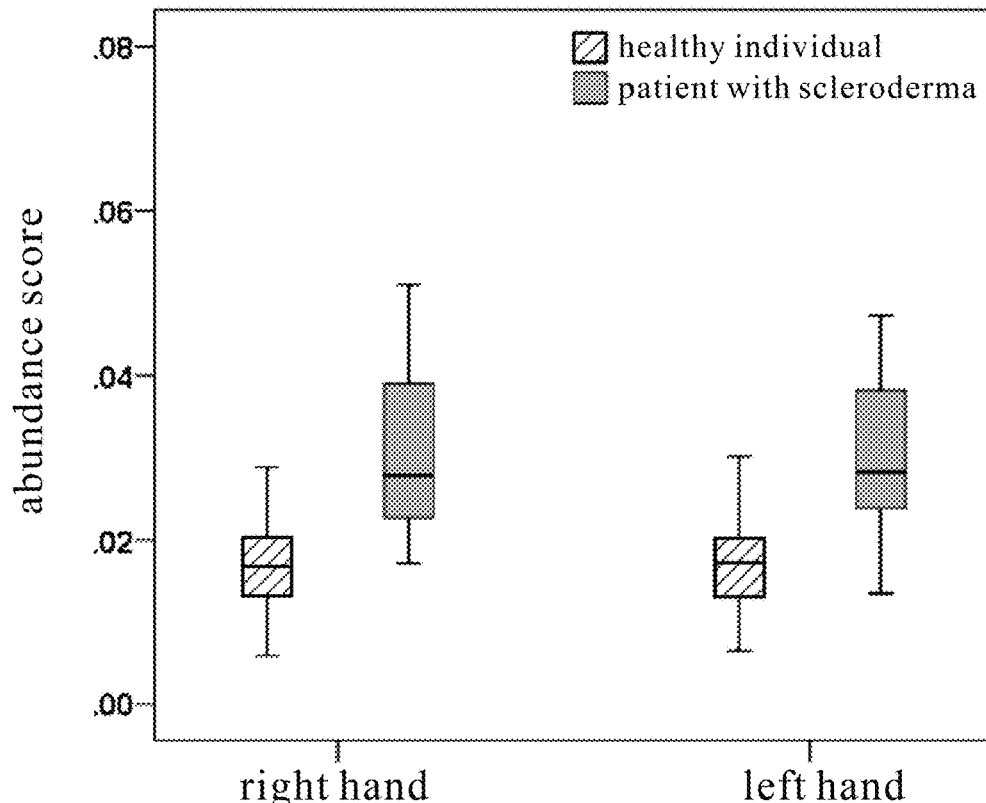
FIG. 9H is a box plot of statistical analysis results of the Mann-Whitney U test based on the conclusions of the aforementioned document.
Figure 10A:
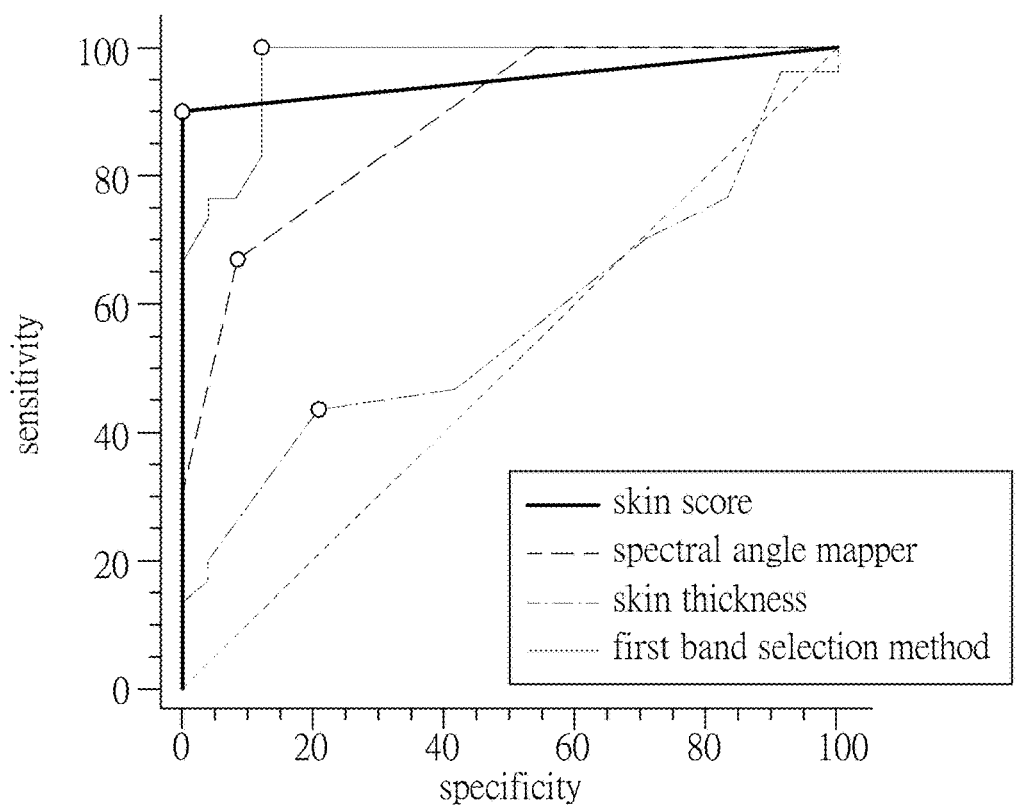
FIGS. 10A to 10G are respectively ROC curve graphs between the first band selection method, the second band selection method, the third band selection method, the fourth band selection method, the fifth band selection method, the sixth band selection method, and the seventh band selection method and skin score, skin thickness and spectral angle mapper in example 2 of the invention.
Figure 10B:
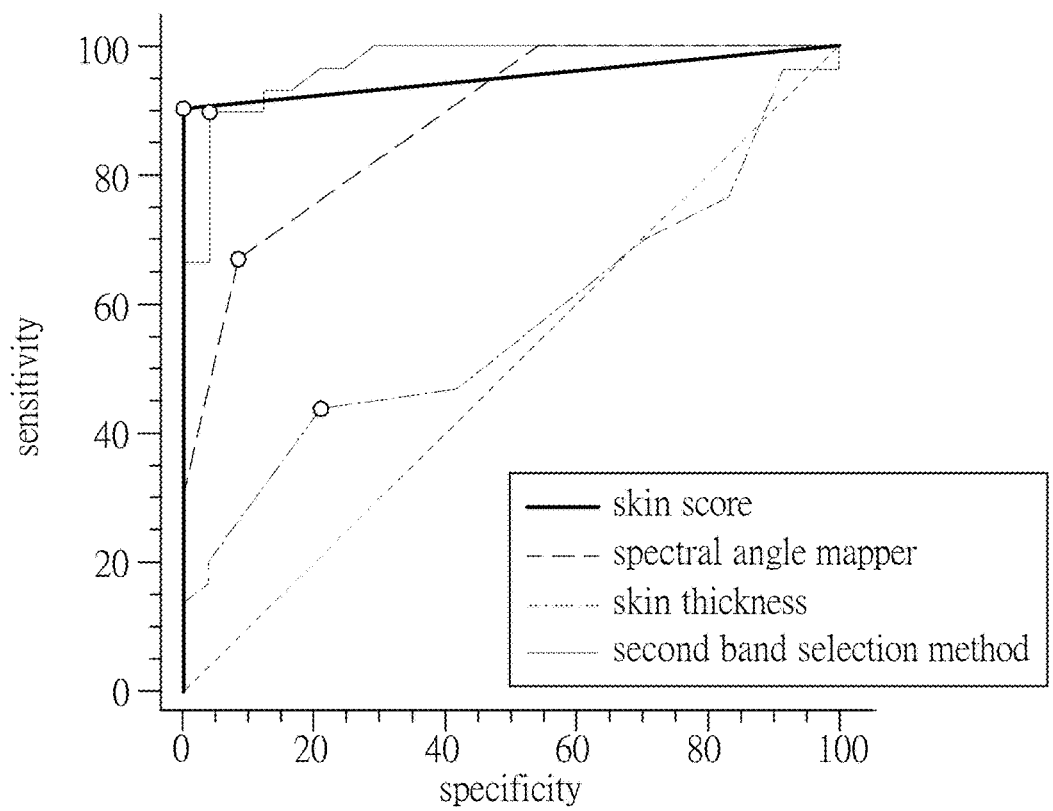
Figure 10C:
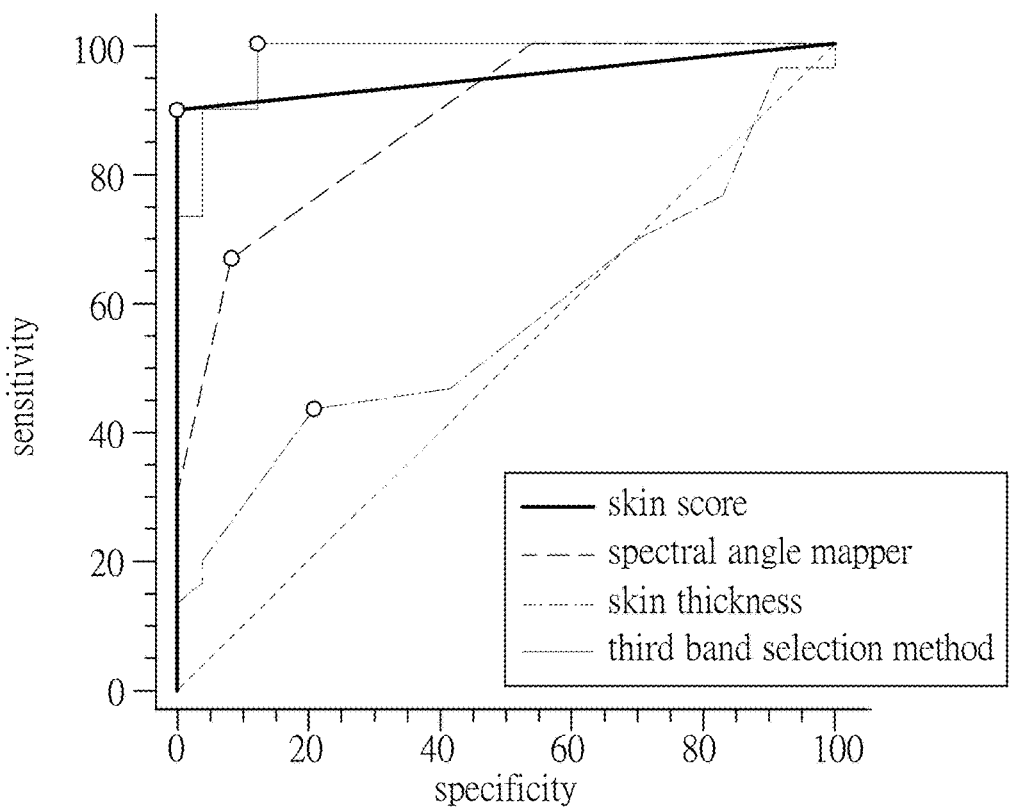
Figure 10D:
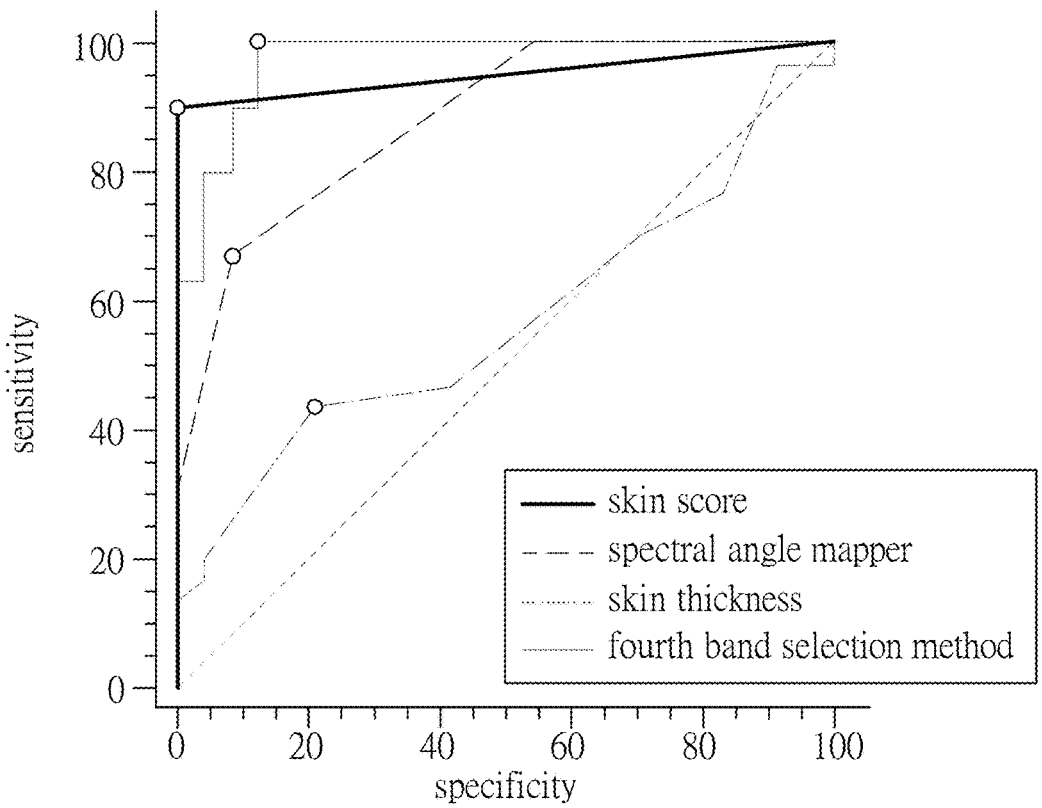
Figure 10E:
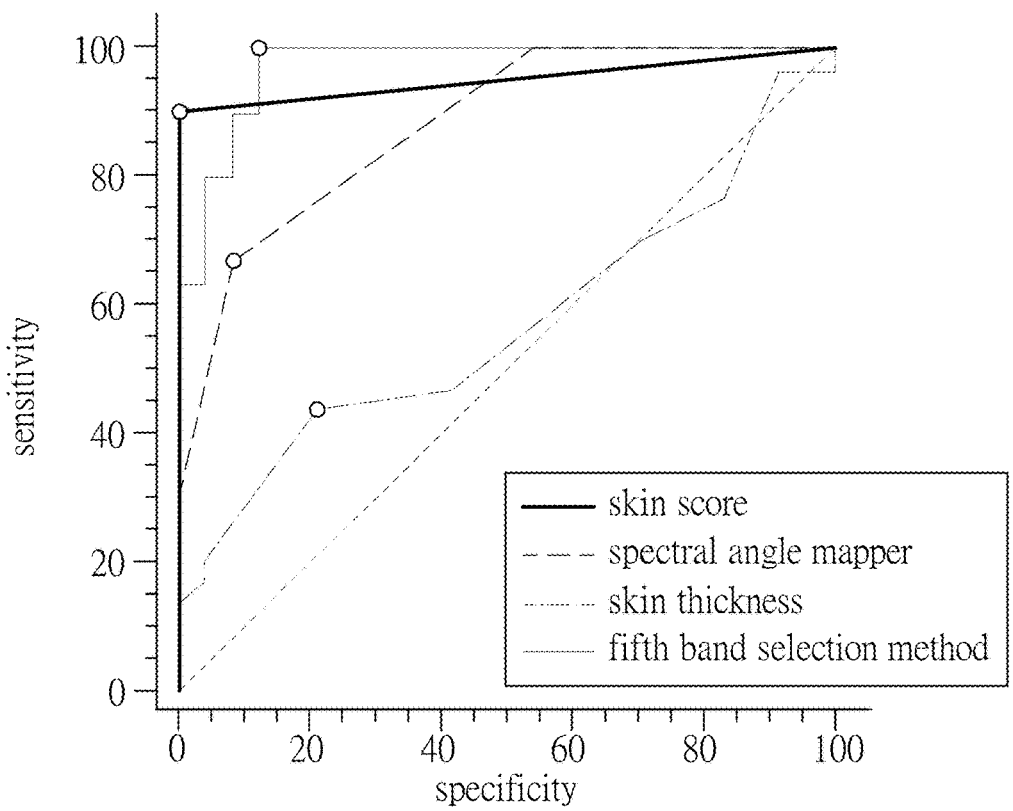
Figure 10F:
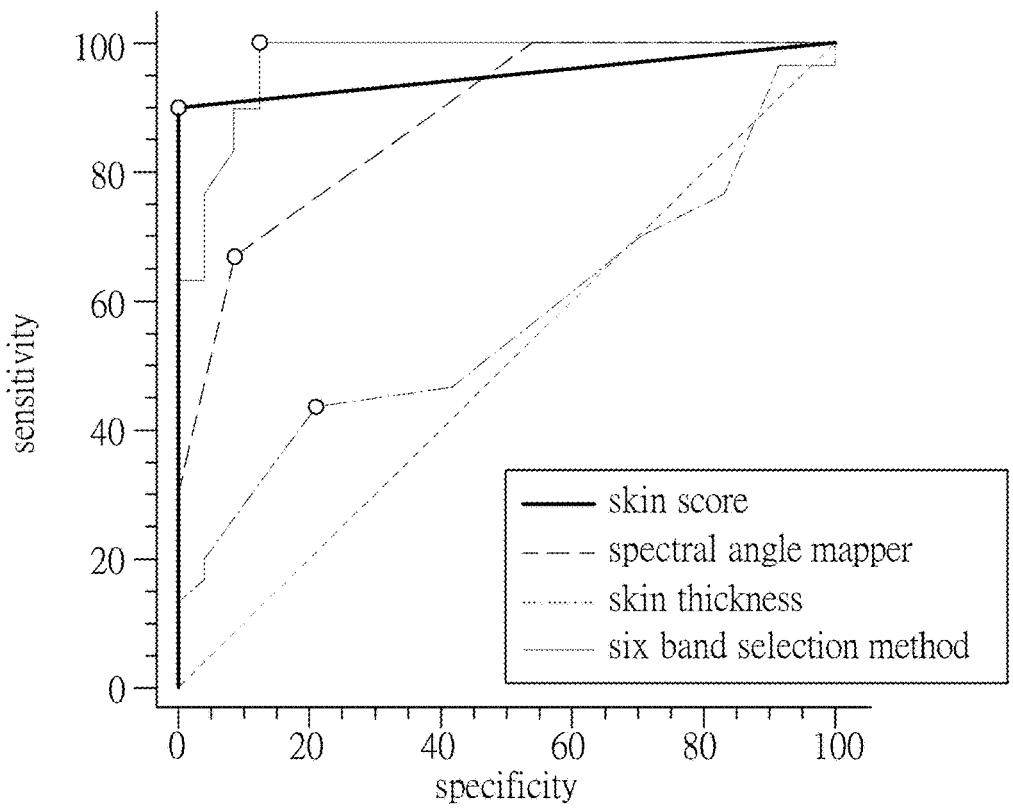
Figure 10G:
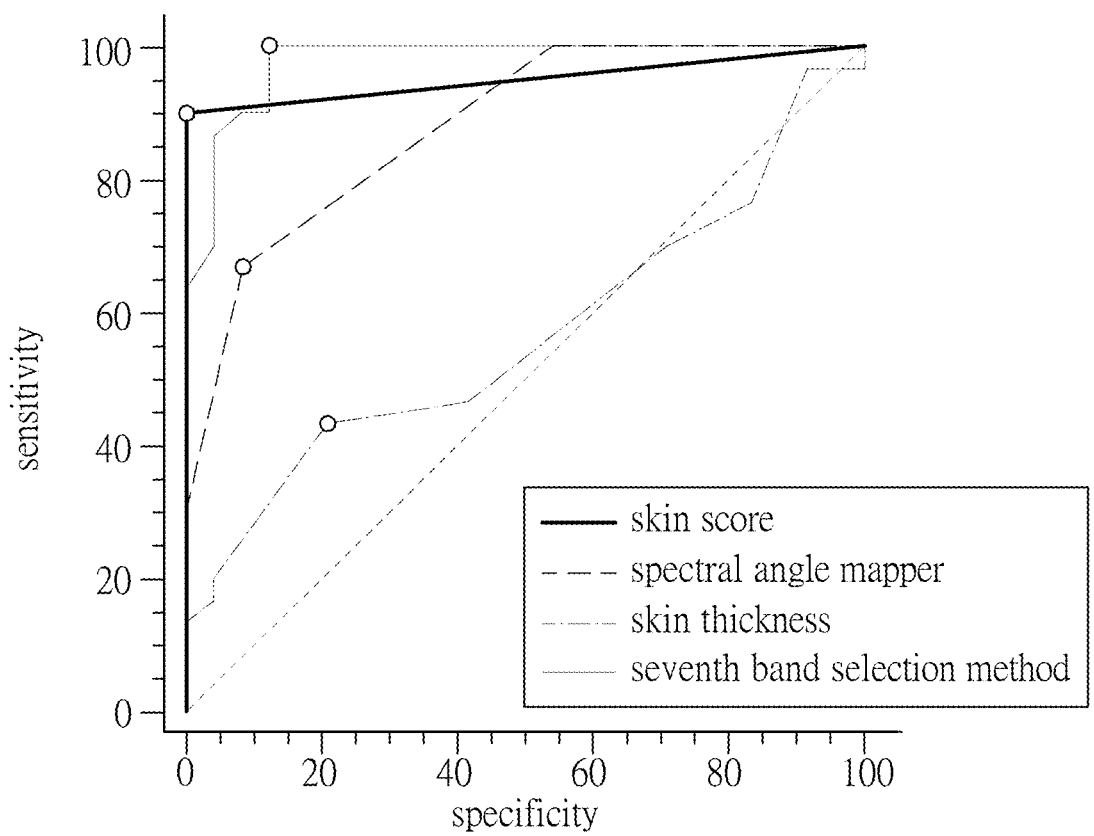

| Band selection method | Number of bands $n_{BS}$ ($P_F = 10^{-4}$) | Band number sorting |
|---|---|---|
| Second band selection method | 32 | 30, 36, 42, 48, 54, 60, 66, 72, 78, 84, 90, 96, 102, 108, 114, 120, 126, 132, 138, 144, 150, 156, 162, 168, 174, 180, 186, 192, 198, 204, 210, 216 |
| Third band selection method | 31 | 68, 80, 46, 83, 30, 85, 125, 88, 117, 136, 90, 113, 93, 110, 101, 144, 151, 155, 220, 158, 209, 159, 201, 161, 163, 194, 165, 167, 187, 170, 176 |
| Fourth band selection method | 32 | 182, 173, 188, 169, 195, 166, 203, 164, 212, 162, 160, 158, 41, 151, 155, 55, 114, 31, 118, 111, 144, 126, 108, 136, 95, 102, 78, 91, 89, 82, 87, 84 |
| Fifth band selection method | 33 | 175, 184, 170, 167, 191, 165, 197, 163, 205, 161, 214, 159, 158, 155, 152, 107, 111, 101, 145, 94, 114, 91, 89, 87, 118, 137, 126, 84, 38, 82, 31, 79, 54 |
| Sixth band selection method | 30 | 195, 202, 189, 182, 173, 169, 211, 166, 164, 43, 58, 162, 31, 150, 160, 157, 78, 143, 132, 120, 115, 111, 108, 95, 102, 82, 91, 89, 84, 87 |
| Seventh band selection method | 30 | 86, 84, 89, 91, 100, 105, 82, 159, 110, 158, 113, 155, 141, 117, 127, 152, 161, 79, 163, 165, 30, 167, 176, 170, 65, 220, 186, 38, 194, 203 | it can be found from Table 5 above that among the characteristic bands selected by the third band selection method, the fourth band selection method, the fifth band selection method, the sixth band selection method, and the seventh band selection method respectively, the band numbers (wavelengths) of the first spectral bands in order are 68 (1085 nm), 182 (1467 nm), 175 (1443 nm), 195 (1510 nm), and 86 (1146 nm) respectively, moreover, the spectral bands selected by the different methods are distributed evenly, indicating that the methods are equally capable of judging the presence or absence of scleroderma;

furthermore, in Table 5, the characteristic bands selected by the fourth band selection method, the fifth band selection method, and the sixth band selection method have 7 identical spectral bands, that is, the band numbers (wavelengths) are respectively 31 (960 nm), 82 (1132 nm), 84 (1139 nm), 87 (1149 nm), 89 (1156 nm), 91 (1162 nm), and 111 (1230 nm), although the orderings of these spectral bands are found to be different;

in addition, for biological tissues, the wavelength of water is 1450 nm, and the wavelength of lipid and collagen is 1100 nm, there are obvious differences in the vicinity of these two spectral bands, and among the characteristic bands selected by the methods, there are spectral bands close to 1100 nm and 1450 nm, so 1100 nm and 1450 nm can be used as a basis for scleroderma test;

step 206: analysis and comparison of correlation coefficient then, the hyperspectral imaging soft abundance scorer designed by the improved constrained energy minimization is used to calculate a disease severity (soft abundance score) for the characteristic bands, and finally, statistical comparisons are performed with clinical data (such as skin thickness) and the results of the aforementioned document using the spectral angle mapper to assess disease severity;

FIGS. 9A to 9G are respectively box plots of statistical analysis results of the Mann-Whitney U test on left and right hand skin soft abundance scores of healthy individuals and patients with scleroderma calculated by the first band selection method, the second band selection method, the third band selection method, the fourth band selection method, the fifth band selection method, the sixth band selection method, and the seventh band selection method adopted in the invention, wherein, the average abundance scores of the hand skin of the healthy individuals are close to 1, while the average abundance scores of the hand skin of the patients with scleroderma are around 0.5;

however, in FIG. 9H, box plots of statistical analysis results of the Mann-Whitney U test based on the conclusions of the aforementioned document are shown, in which the average value of the healthy individuals is around 0.019, while the average value of the patients with scleroderma is around 0.22;

both the invention and the aforementioned document use the hyperspectral profiles of the skin of the healthy individuals as analysis criteria, but the results are very different, a main reason is that the hyperspectral imaging soft abundance scorer disclosed in the invention can be regarded as a filter capable of suppressing and comparing signals with different reference spectral profiles, and highlighting the desired target profile signals;

contrarily, the spectral angle mapper adopted in the aforementioned document only compares differences between two spectral profiles, although the statistical results of the healthy individuals and the patients with scleroderma are significantly different, the analyzed results of the average values of the patients with scleroderma are similar to those of the healthy individuals;

then, the results of the soft abundance scores of all the methods are statistically compared, and the results are significantly different, as shown in Table 6;

TABLE 6 soft abundance score of subjects in different analysis methods and their statistical data

| Band selection method | Soft abundance score of healthy individual (HC) (Number of people n = 24) | Soft abundance score of patient with scleroderma (SSc) (Number of people n = 30) | Significant difference reference value P value |
|---|---|---|---|
| Right hand | | | |
| First band selection method | 1.03 (0.86-1.11) | 0.44 (0.29-0.59) | <0.001** |
| Second band selection method | 0.98 (0.89-1.12) | 0.58 (0.33-0.69) | <0.001** |
| Third band selection method | 0.99 (0.88-1.14) | 0.52 (0.32-0.64) | <0.001** |
| Fourth band selection method | 1.00 (0.89-1.12) | 0.52 (0.34-0.65) | <0.001** |

TABLE 6-continued soft abundance score of subjects in different
analysis methods and their statistical data

| Band selection method | Soft abundance score of healthy individual (HC) (Number of people n = 24) | Soft abundance score of patient with scleroderma (SSc) (Number of people n = 30) | Significant difference reference value P value |
|---|---|---|---|
| Fifth band selection method | 1.00 (0.89-1.12) | 0.52 (0.34-0.65) | <0.001** |
| Sixth band selection method | 0.99 (0.88-1.12) | 0.52 (0.34-0.64) | <0.001** |
| Seventh band selection method | 0.99 (0.90-1.14) | 0.51 (0.32-0.63) | <0.001** |
| Spectral angle mapper (SAM) | 0.02 (0.01-0.02) | 0.03 (0.02-0.04) | <0.001** |
| Left hand | | | |
| First band selection method | 1.01 (0.91-1.16) | 0.45 (0.30-0.64) | <0.001** |
| Second band selection method | 1.00 (0.94-1.11) | 0.55 (0.35-0.73) | <0.001** |
| Third band selection method | 1.01 (0.92-1.14) | 0.49 (0.32-0.69) | <0.001** |
| Fourth band selection method | 1.02 (0.92-1.15) | 0.49 (0.34-0.69) | <0.001** |
| Fifth band selection method | 1.02 (0.93-1.16) | 0.48 (0.34-0.70) | <0.001** |
| Sixth band selection method | 1.03 (0.93-1.15) | 0.49 (0.33-0.68) | <0.001** |
| Seventh band selection method | 1.01 (0.93-1.14) | 0.47 (0.32-0.69) | <0.001** |
| Spectral angle mapper (SAM) | 0.02 (0.01-0.02) | 0.03 (0.02-0.04) | <0.001** |

Mann-Whitney U test, interquartile range (IQR) median, wherein, *p < 0.05, **p < 0.01, the * mark is significant, and the ** mark is very significant.

furthermore, it has been preliminarily proved in the aforementioned document that hyperspectral image analysis technology is superior to the current clinical diagnosis method (i.e., skin thickness detection) in assessing the disease of patients with scleroderma, therefore, the first band selection method, the second band selection method, the third band selection method, the fourth band selection method, the fifth band selection method, the sixth band selection method, and the seventh band selection method are compared with the aforementioned document;

as shown in comparison results of Spearman's rank correlation coefficient between the methods in Table 7, wherein, because the invention uses the hyperspectral profiles of the healthy individuals as comparison criteria, and the smaller the calculated value of the spectral angle mapper, the closer to the hyperspectral profile of the healthy individual, so all the analysis results of the spectral angle mapper and the different band selection methods are negatively correlated, that is, their Spearman's rank correlation coefficients are all above −0.631;

the first band selection method, the third band selection method, the fourth band selection method, the fifth band selection method, the sixth band selection method and the seventh band selection method all have the Spearman's rank correlation coefficients as high as 0.965 and above;

TABLE 7

Spearman's rank correlation coefficient comparison table of different analysis methods

| | Spectral angle mapper (SAM) | First band selection method | Second band selection method | Third band selection method | Fourth band selection method | Fifth band selection method | Sixth band selection method | Seventh band selection method |
|---|---|---|---|---|---|---|---|---|
| Spectral angle mapper (SAM) | — | | | | | | | |
| First band selection method | −.645** | — | | | | | | |
| Second band selection method | −.667** | .965** | — | | | | | |
| Third band selection method | −.648** | .987** | .987** | — | | | | |
| Fourth band selection method | −.635** | .982** | .988** | .996** | — | | | |
| Fifth band selection method | −.639** | .982** | .987** | .994** | .999** | — | | |
| Sixth band selection method | −.631** | .987** | .986** | .997** | .998** | .997** | — | |
| Seventh band selection method | −.652** | .988** | .987** | .998** | .997** | .997** | .998** | — |

Spearman's rank correlation coefficient, wherein, *p < 0.05, **p < 0.01, the * mark is significant, and the ** mark is very significant.

it can be known from the foregoing that the first band selection method, the second band selection method, the third band selection method, the fourth band selection method, the fifth band selection method, the sixth band selection method and the seventh band selection istic (ROC) curves, as shown in FIGS. 10A to 10G, then, the methods are respectively compared with skin score and skin thickness assessed by clinicians, and the analysis results of the aforementioned document for hands with scleroderma, as shown in Table 8.

TABLE 8 statistical table of ROC curve results of each method

| Band selection method | Area under curve AUC (95% CI) | P value | Sensitivity | Specificity | Accuracy |
|---|---|---|---|---|---|
| Spectral angle mapper (SAM) | 0.881 (0.763-0.953) | <0.001 | 66.67% | 91.67% | 77.80% |
| Skin score | 0.950 (0.854-0.991) | <0.001 | 90.00% | 100.00% | 94.40% |
| Skin thickness | 0.567 (0.426-0.702) | 0.390 | 43.33% | 79.17% | 59.30% |
| First band selection method | 0.969 (0.882-0.997) | <0.001 | 100.00% | 87.50% | 94.40% |
| Second band selection method | 0.971 (0.884-0.998) | <0.001 | 90.00% | 95.83% | 92.60% |
| Third band selection method | 0.981 (0.900-0.999) | <0.001 | 100.00% | 87.50% | 94.40% |
| Fourth band selection method | 0.981 (0.900-0.999) | <0.001 | 100.00% | 87.50% | 94.40% |
| Fifth band selection method | 0.972 (0.886-0.998) | <0.001 | 100.00% | 87.50% | 94.40% |
| Sixth band selection method | 0.972 (0.886-0.998) | <0.001 | 100.00% | 87.50% | 94.40% |
| Seventh band selection method | 0.977 (0.894-0.999) | <0.001 | 100.00% | 87.50% | 94.40% | method adopted in the invention are respectively superior to the spectral angle mapper used in the aforementioned document, a main possible reason is that the spectral angle mapper only takes differences of spectral vectors into consideration, and the invention uses the improved constrained energy minimization to perform sub-pixel detection, during detection, the autocorrelation matrix in the calculation formula takes into account the relationship between the sample data, so the analysis results are better than those of the spectral angle mapper;

furthermore, it can be found from the contents of Table 7 that there is a very high correlation between the first band selection method, the second band selection method, the third band selection method, the fourth band selection method, the fifth band selection method, the sixth band selection method and the seventh band selection method adopted in the invention, which means that the selected characteristic bands are all representative, so there will be no difference in analysis;

in addition, we can also find that the correlation coefficients between the second band selection method, the third band selection method, and the fourth band selection method in Table 7 are as high as 0.997 and above, a possible reason is that the essence of these three methods is describing the relationship between high-order statistic of data, so there are such high correlation coefficients; and step 207: ROC curve comparison analysis in order to understand an ability of the first band selection method, the second band selection method, the third band selection method, the fourth band selection method, the fifth band selection method, the sixth band selection method, and the seventh band selection method adopted in the invention in discriminating scleroderma, the abundance scores calculated by the methods are assessed by receiver operating character- In addition, it can be found from FIG. 10A to FIG. 10G and Table 8 that the area under curve or the accuracy of each of the methods adopted in the invention is far better than the clinical skin thickness measurement method, and also better than the spectral angle mapper of the aforementioned document, and better than or equivalent to the skin assessment score results of clinicians.

Wherein, the spectral angle mapper is not consistent with the analysis results of the aforementioned document, which can be caused by differences in number of samples and the characteristics of the spectral angle mapper itself. In detail, a sample ratio of the patients with scleroderma to the healthy individuals in the aforementioned document is 31:19, while a sample ratio of the patients with scleroderma to the healthy individuals in the invention is 30:24. Moreover, the spectral angle mapper only compares differences between two spectra, so if there are noise interferences (such as skin dandruff, mole, or microvascular rupture, etc.) on the hand skin of the healthy individual, such factors will cause differences of spectra during analysis. Therefore, when classifying the presence or absence of scleroderma, according to the analysis results of the spectral angle mapper, its sensitivity and specificity decrease, which are different from the analysis results of the aforementioned document.

Therefore, the invention further discloses the hyperspectral imaging soft abundance scorer to improve the problem that the conventional spectral angle mapper cannot take into account the spectral profile correlation between all skins, and when using the constrained energy minimization (CEM) to perform analysis by the soft abundance scorer, noise interferences are suppressed, so that these noise interferences can be reduced without causing bias or errors in statistical correlation analysis.

In summary, the invention uses the hyperspectral imaging soft abundance scorer to analyze the hyperspectral images of the hand skin of scleroderma, and the calculated soft abundance scores can be used for judging a severity of scleroderma. Furthermore, the invention further discusses the relationship between the bands of the hyperspectral images of the hand skin of scleroderma by using the band sorting method based on high-order statistics and infinite-order statistics, it can be known from the analysis results that most of the characteristic bands selected by the different band selection methods are similar, and an efficacy of determining a severity of disease by using the abundance scores calculated after finding the characteristic bands is considerably outstanding, which can be used as reference opinions provided for assisting clinicians in diagnosis.

In addition, the characteristic bands selected by the invention can further be used for improving conventional hyperspectral imaging instruments.

Figure 11:
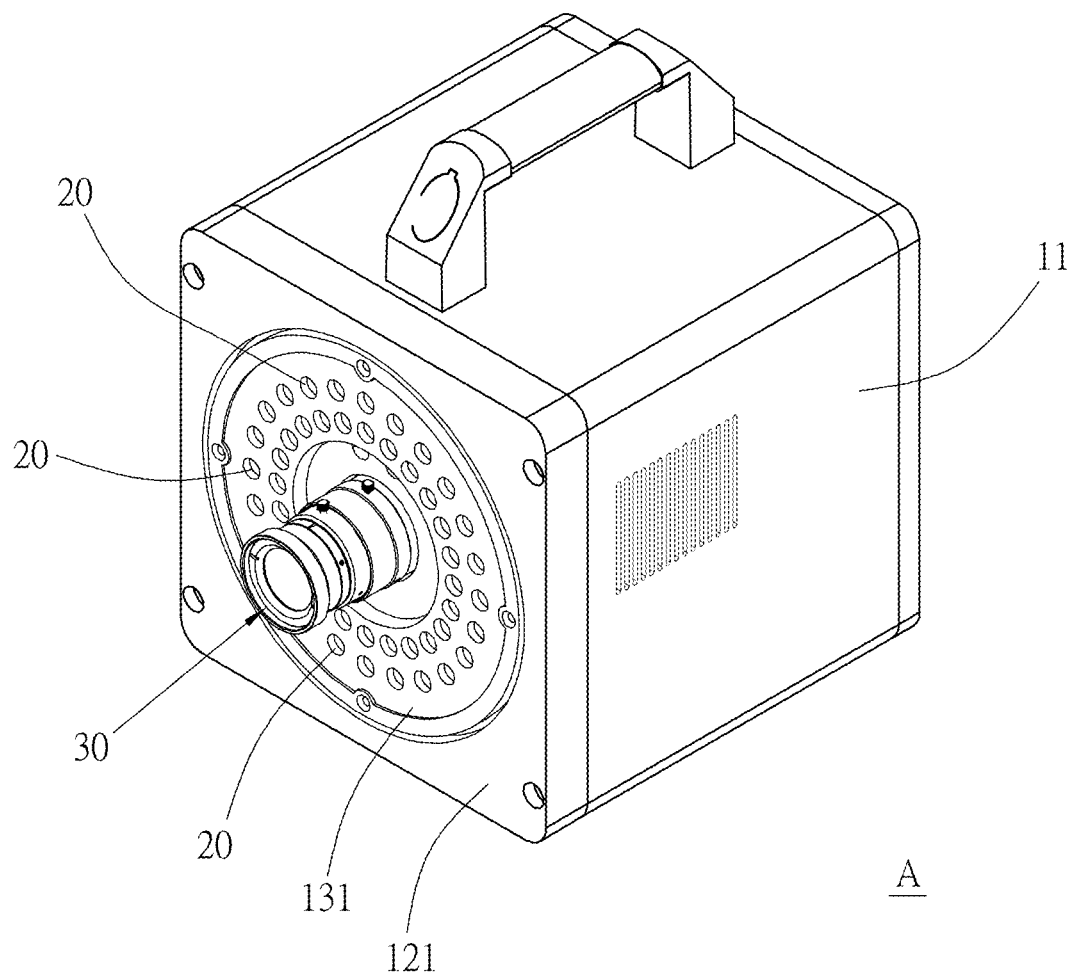
FIG. 11 is a perspective assembled view of an active hyperspectral imaging device of the invention.
Figure 12:
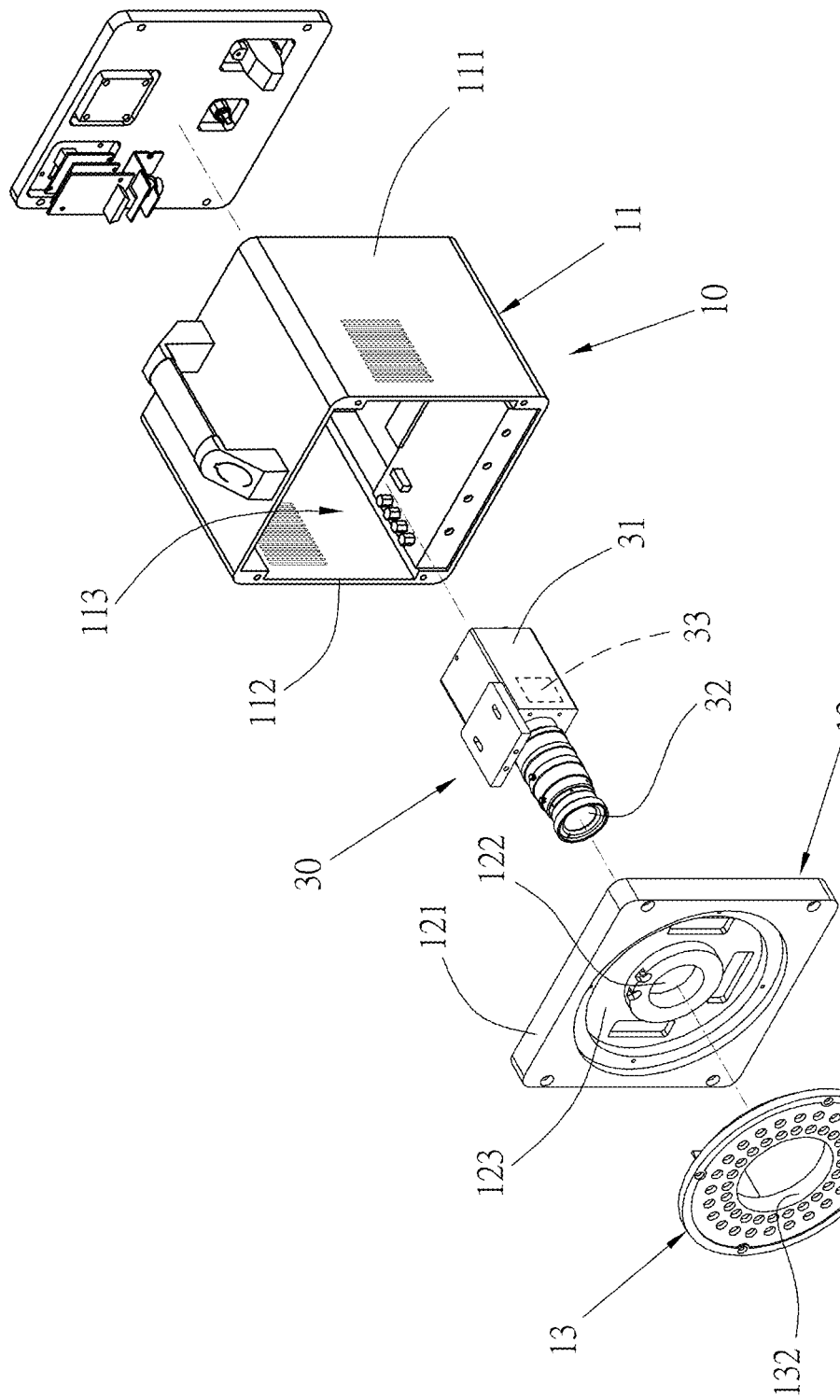
FIG. 12 is an exploded perspective view of the active hyperspectral imaging device of the invention.
Figure 13:
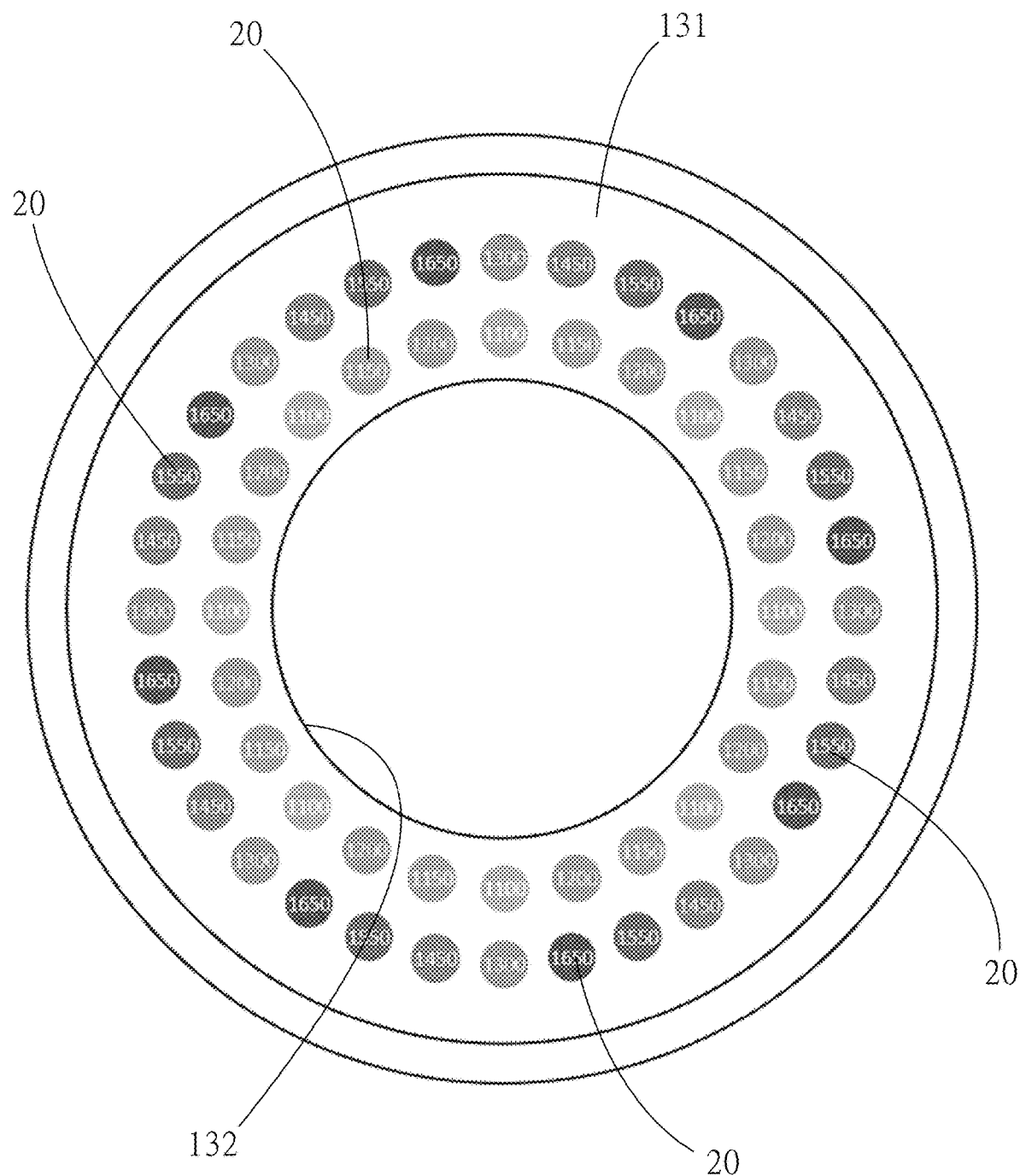
FIG. 13 is a schematic diagram of positions of light sources and their spectral bands of the active hyperspectral imaging device of the invention.

In FIGS. 11 to 13, the active hyperspectral imaging device A disclosed in another embodiment of the invention is shown. The device A mainly comprises a base 10, a plurality of light sources 20 and a sensing portion 30.

The base 10 has a casing 11, a cover 12 and a seat 13, wherein the casing 11 has a casing body 111 and an assembly opening 112 opened on the casing body 111, so that an inner space 113 of the casing body 111 communicates externally.

The cover 12 has a plate-shaped cover body 121 connected to the casing body 111 by corresponding to the assembly opening 112; a first hole 122 with an appropriate diameter penetrating the cover body 121 at a central position; and a recess 123 with an appropriate depth recessed on one side of the cover body 121 and communicated with the first hole 122.

The seat 13 has an annular seat body 131 and a second hole 132 with an appropriate diameter. The second hole 132 axially penetrates the seat body 131 along a center of the seat body 131, and the seat body 131 is used for removably inserting into the recess 123 to make the second hole 132 coaxial with the first hole 122.

Each of the light sources 20 is selected from the shortwave infrared (SWIR) LED lights produced by USHIO, Inc., Tokyo, Japan or its Taiwan subsidiary, USHIO TAIWAN, INC., among which, there are many types of shortwave infrared LED lights, which can be roughly divided into SMBB, EDC, SMT and SMC series. Taking factors of hardware structure design, price, LED chip function and LED light source emission characteristics into consideration, this embodiment adopts LED products of the EDC series, and an area of a single LED product is 3.5 mm×3.5 mm.

In particular, bands emitted by each of the light sources 20 are respectively configured according to the characteristic bands or the preferred characteristic bands calculated by the hyperspectral characteristic band selection method. For diabetes, according to the conclusion of Example 1, the spectral bands of the light sources 20 can be selected from 1100 nm, 1150 nm, 1200 nm, 1300 nm, 1450 nm, 1550 nm, and 1650 nm, seven types of bands in total.

Further, a number of the light sources 20 is 56, and every eight light sources 20 adopt a same spectral band, and are arranged annularly on the seat body 131 respectively by using the second hole 132 as a center, as shown in FIG. 13.

Furthermore, as a power of the LED increases and a heat dissipation efficiency is improved, light decay can be reduced and service life can be prolonged. Therefore, the seat body 131 is made of porous ceramic molding technology capable of providing more air contact area, in addition to good thermal conductance and heat dissipation performance, on the basis of this advantage, flexibility of circuit design or heat dissipation structure design of the active hyperspectral imaging device A is improved.

In the invention, the light sources 20 are disposed on the seat body 131 to form a set of light source component for diabetes detection, and the light source component is suitable for being embedded in the recess 123 of the cover 12 as a means of fixing. In other embodiments, the light source component for detection can also be positioned on the cover 12 by other fixing means such as locking by screws or magnetic attraction.

In addition, the active hyperspectral imaging device A of the invention is not only capable of detecting diabetes, but also applicable to other diseases, such as disease detection of patients with scleroderma, and the light source component for detection only needs to be replaced, scleroderma can be quickly and conveniently detected. Wherein, selected spectral bands of the light sources 20 included in the replaceable light source component for detection can be calculated for scleroderma by the hyperspectral characteristic band selection method. According to the conclusion of Example 2, the spectral bands of the light sources 20 can be selected as 1100 nm and 1450 nm, a total of two types of bands.

It can be known from the above that the light source component for detection can be replaced quickly and conveniently to correspond to different predetermined diseases, which is considerably convenient in practical operation.

The sensing portion 30 has a main body 31, a columnar image capturing lens 32 and a processing unit 33, wherein the main body 31 is disposed in the inner space 113 of the casing 11. The image capturing lens 32 can be, but is not limited to, a video camera, a camera, an apparatus including a charge-coupled device (CCD) or a complementary metal-oxide-semiconductor (CMOS), and is disposed on the main body 31 and used for passing through the first hole 122 and the second hole 132 so that one end of a columnar shaft of the lens 32 is exposed outside the casing 11 for receiving reflected light from an external target object irradiated by the light sources 20 to obtain a hyperspectral image, and another end of the columnar shaft of the lens 32 is located in the inner space 113 of the casing 11. Wherein, the target object refers to any one of the subject's hand, arm, face, neck, foot or other parts.

The processing unit 33 is disposed on the main body 31 and is electrically connected with the image capturing lens 32 to receive the hyperspectral image and perform analysis and calculation, and obtain a judgment result of the target object in a predetermined disease, or other diagnostic information.

According to the above structural description, the active hyperspectral imaging device A of the invention is provided with the light sources 20 corresponding to characteristic bands of a predetermined disease, compared with the conventional hyperspectral imaging instrument, it is no longer necessary to reserve a filter and a spectroscope, and also saves the configuration of light pipes and wires of a ring-shaped halogen lamp, so that a volume of the active hyperspectral imaging device A can be reduced to within 18 cm×18 cm×20 cm. Accordingly, an object of light-weight and hand-held design is achieved, in order to scientifically assess early detection of diseases for patients with diabetes and scleroderma, and provide clinicians with more objective diagnostic information for diagnosing patients with diabetes and scleroderma.

Figure 14:
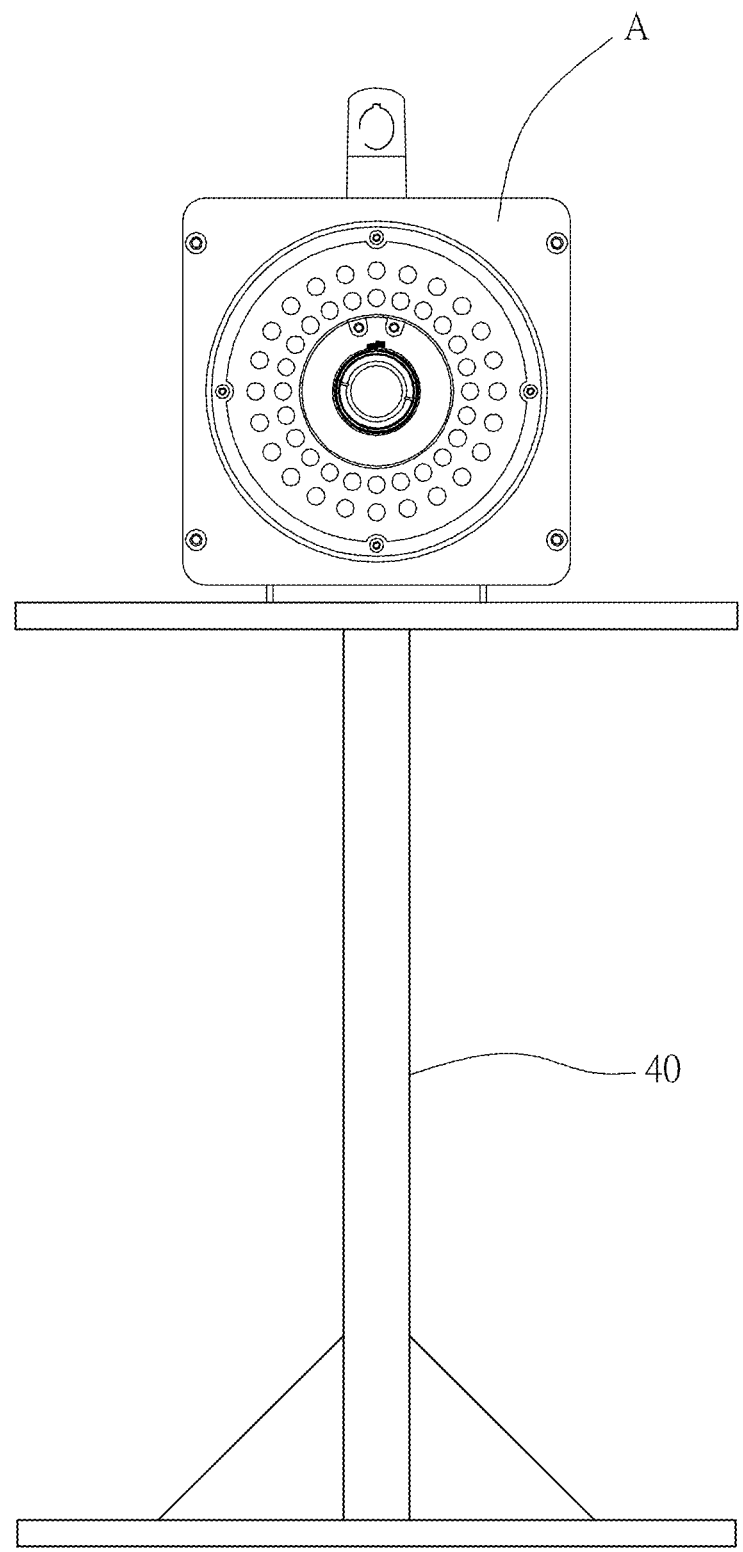
FIG. 14 is a schematic diagram of the active hyperspectral imaging device of a specific embodiment of the invention being installed on a stand.
Figure 15A:
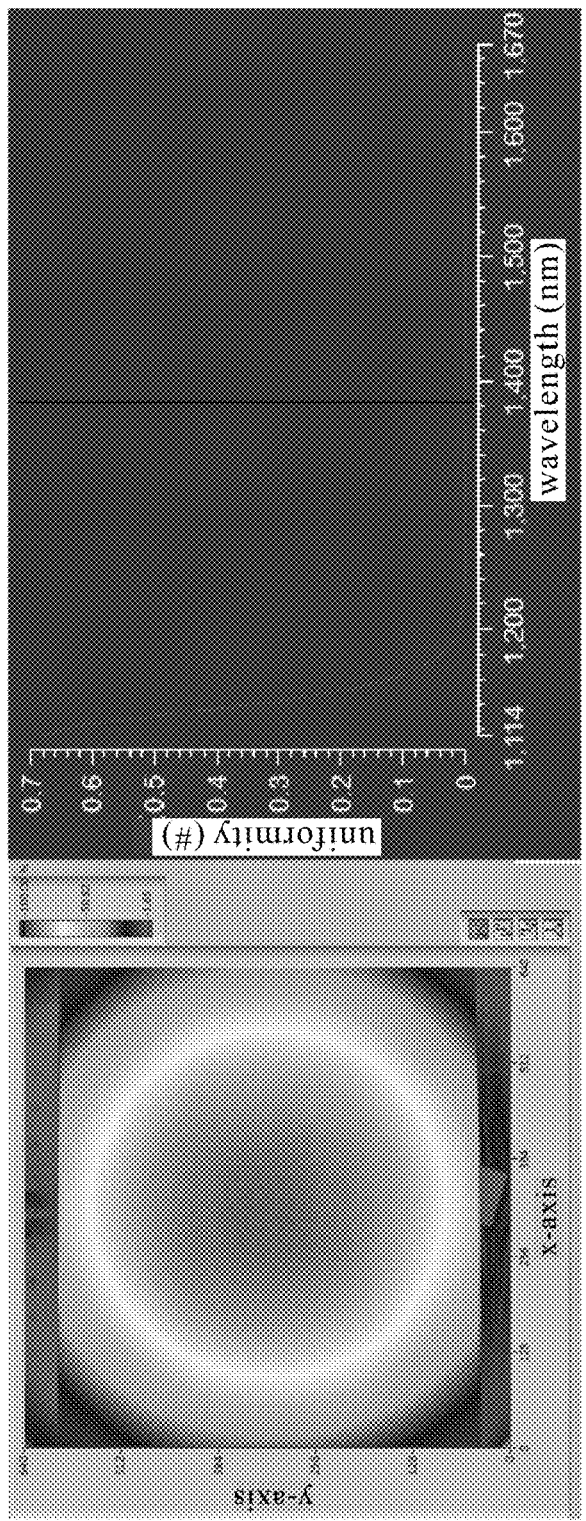
FIGS. 15A to 15G are detection diagrams of light source intensity and uniformity of different characteristic bands (i.e., 1100 nm, 1150 nm, 1200 nm, 1300 nm, 1450 nm, 1550 nm and 1650 nm) respectively.
Figure 15B:
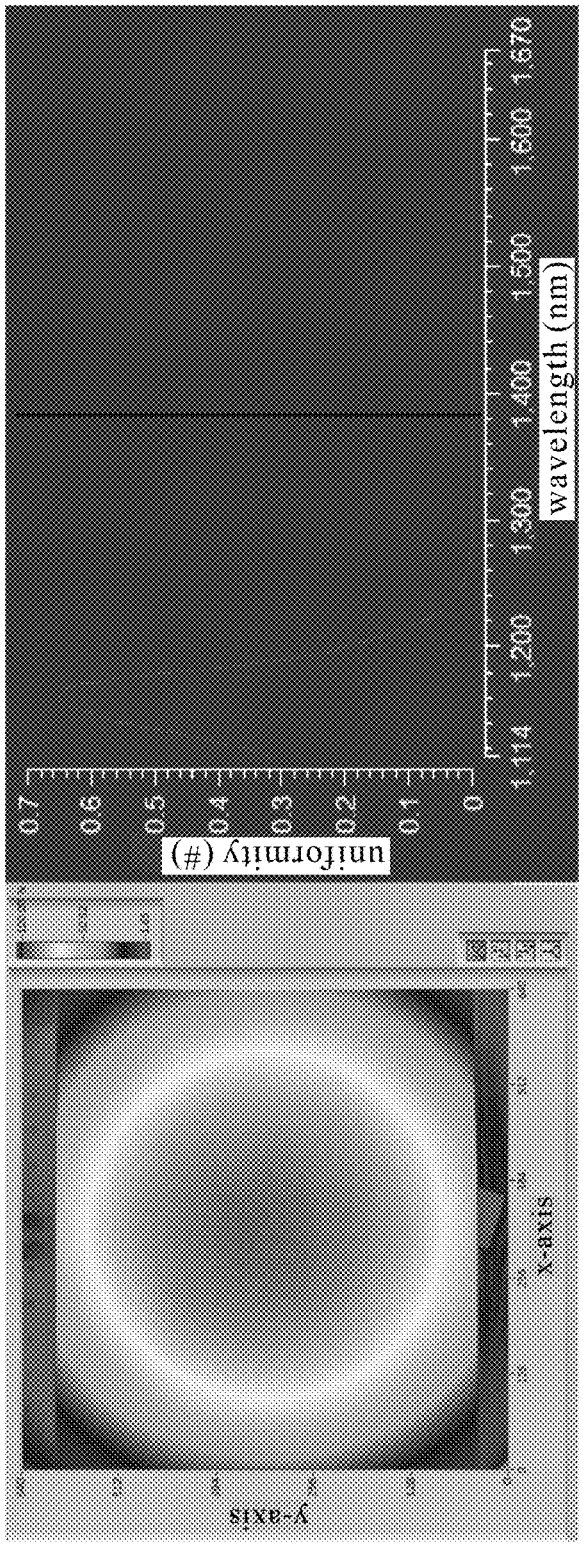
Figure 15C:
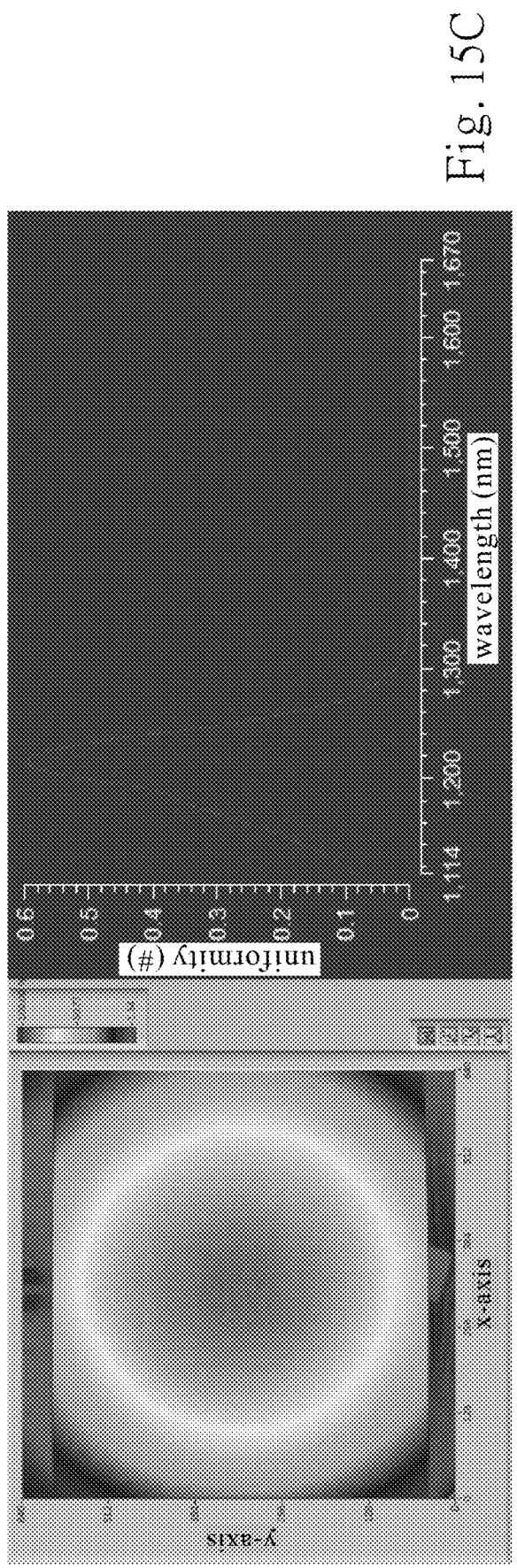
Figure 15D:
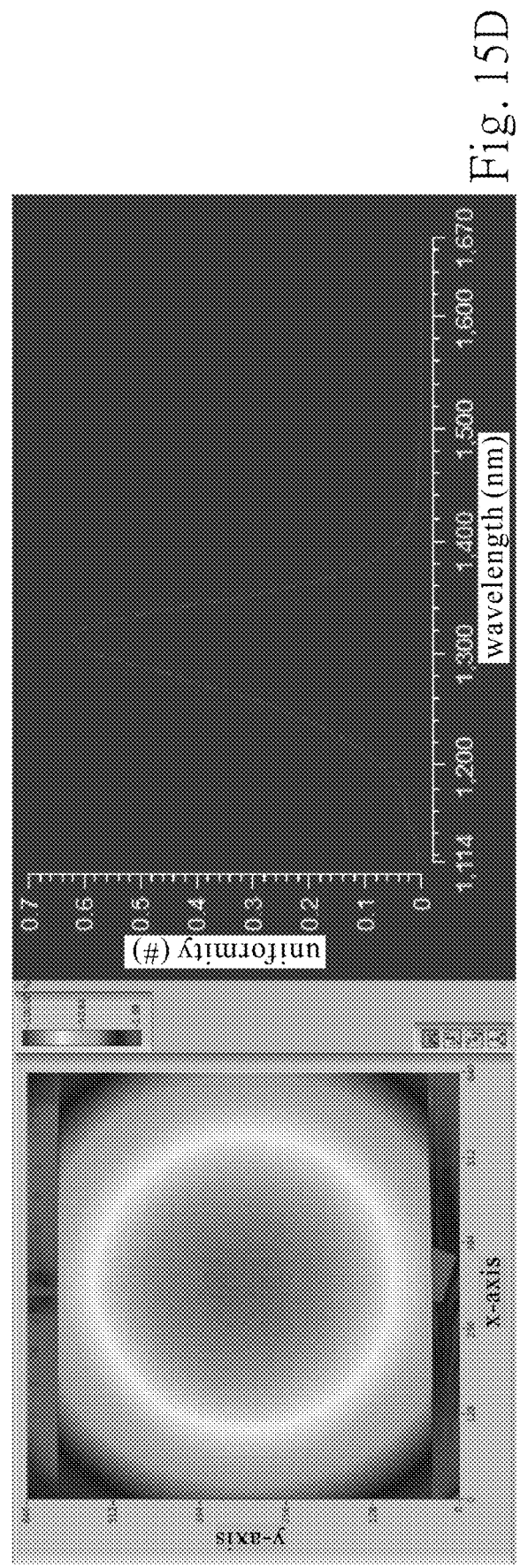
Figure 15E:
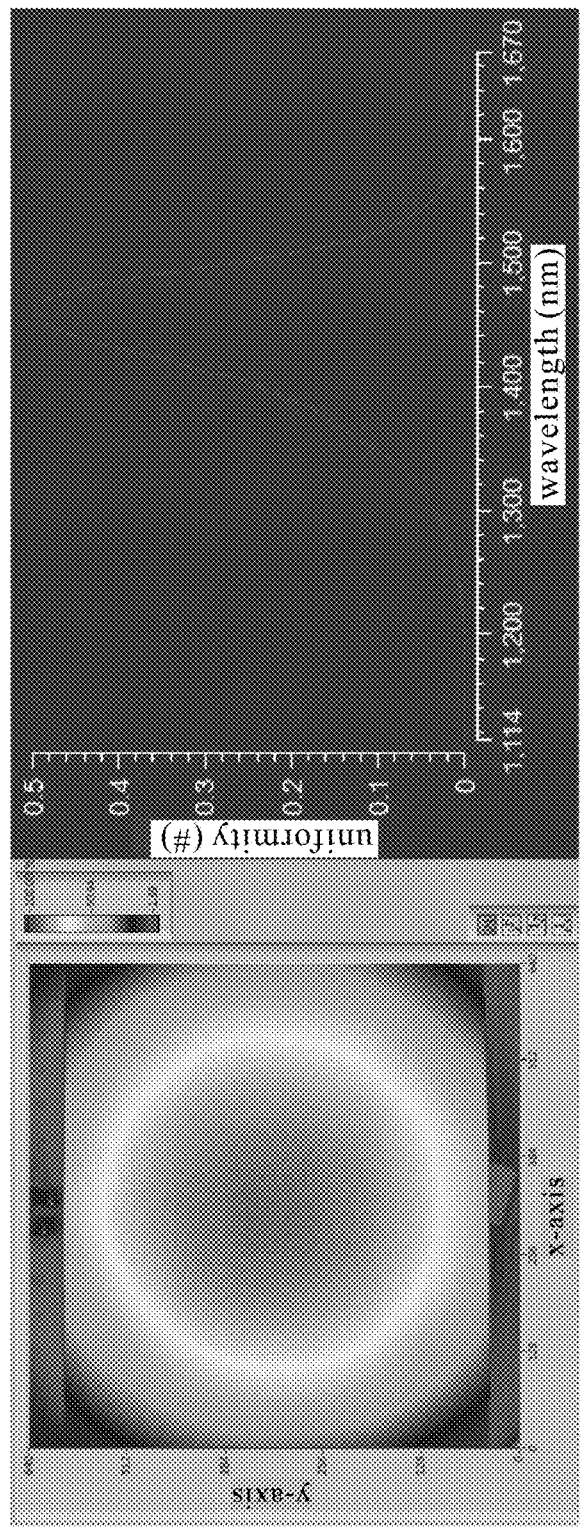
Figure 15F:
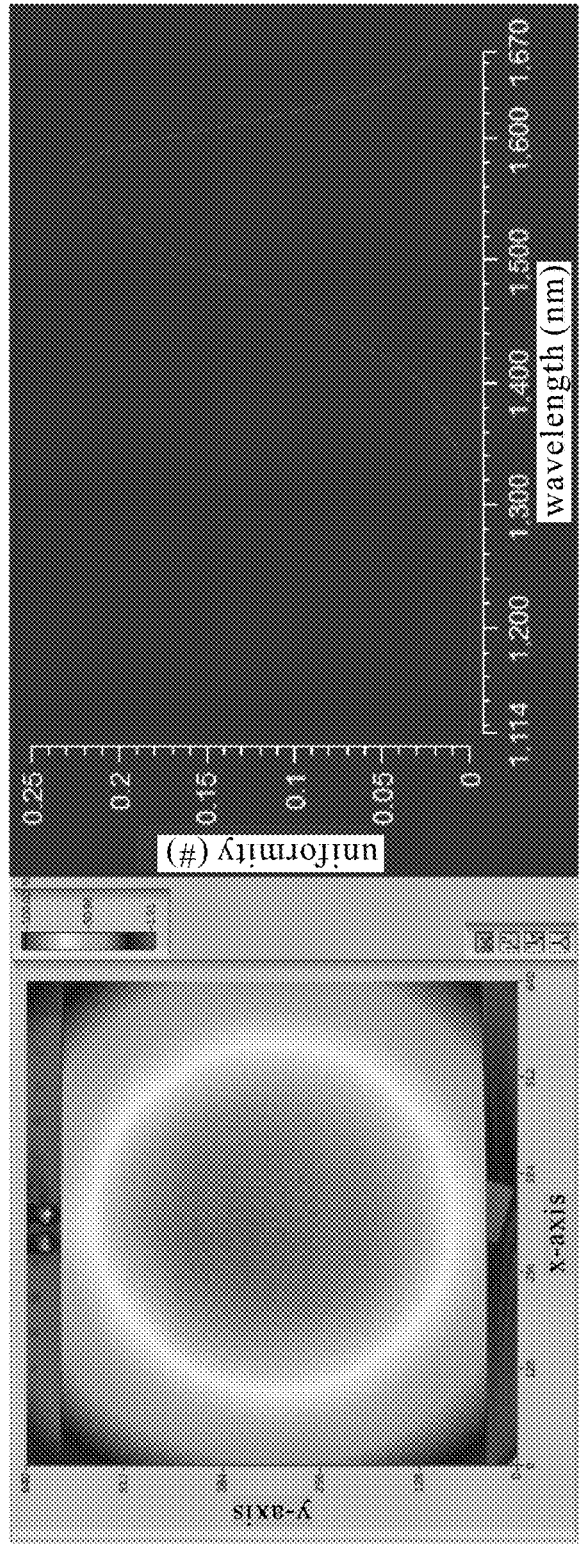
Figure 15G:
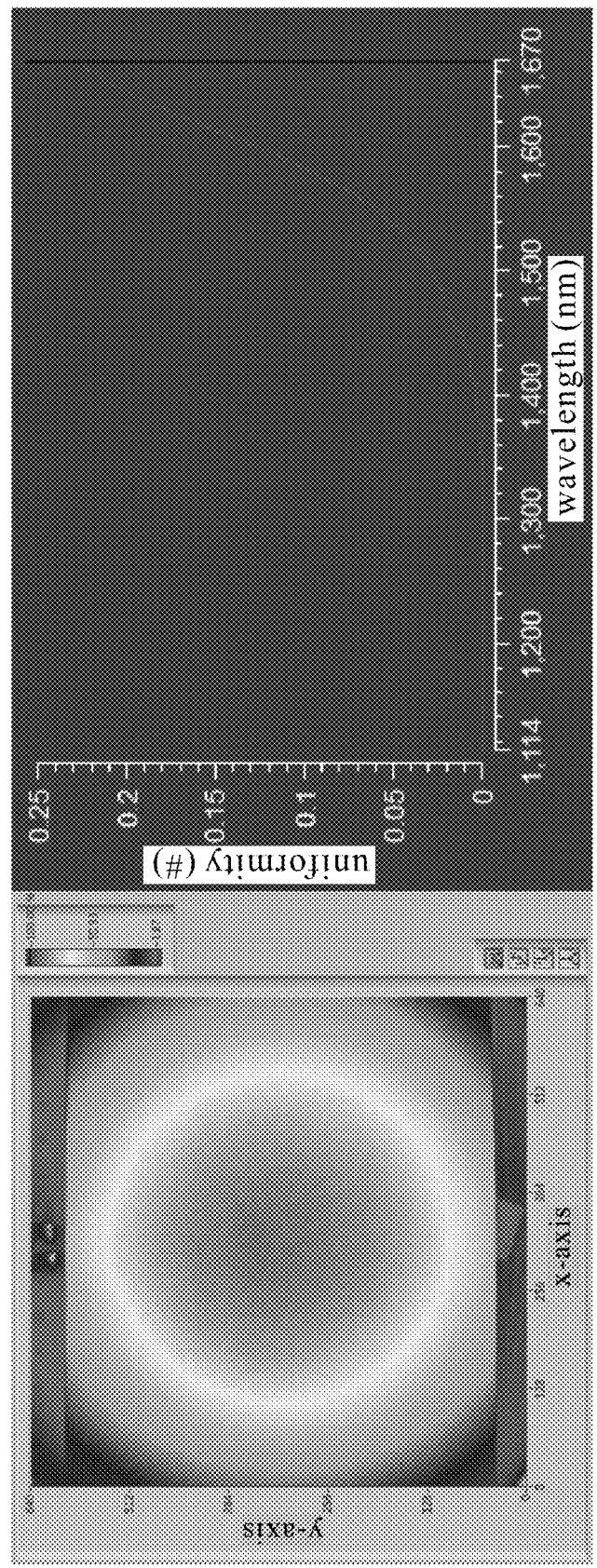

As shown in FIG. 14, in another specific embodiment of the invention, the active hyperspectral imaging device A is installed on a stand 40 so that a working distance between the active hyperspectral imaging device A and the target object is 50 cm, and a distance between the light sources 20 and the target object is 45 cm to provide a largest capturing range, that is, 30 cm×30 cm.

Then, intensity and uniformity of the light sources 20 are tested. Firstly, a white paper is photographed, and a center of a captured image is used as a criterion for measuring intensity, that is, normalization of a grayscale value at the center of the image is 100%, the closer to the center, the higher the grayscale value, and the farther from the center, the lower the grayscale value, thereby converting into intensity attenuation of the light sources 20.

Finally, the above-mentioned 7 bands (i.e., 1100 nm, 1150 nm, 1200 nm, 1300 nm, 1450 nm, 1550 nm, and 1650 nm) are tested respectively. Intensity and uniformity of each of the bands in a range of 25 cm×25 cm can reach above 80%, and intensity and uniformity in a range of 30 cm×30 cm can reach above 60%, as shown in FIG. 15A to FIG. 15G.

What is claimed is:

1. A hyperspectral characteristic band selection method comprising following steps of:
   step A: using a virtual dimension algorithm to calculate a number of endmembers of a hyperspectral image of a predetermined disease, and using between 1 time and 2 times the number of the endmembers as a number of predetermined selected bands, the number being defined as n, and n being a non-zero natural number; and
   step B: selecting n characteristic bands with a number matching the number of the selected bands from a plurality of spectral bands included in the hyperspectral image;
   wherein in step B, calculating priority scores of all spectral bands by band prioritization, and using the top n spectral bands with higher priority scores as characteristic spectra.

2. The hyperspectral characteristic band selection method as claimed in claim 1, wherein the predetermined disease is scleroderma, the number of the selected bands is preferably 1.5 times the number of the endmembers.

3. The hyperspectral characteristic band selection method as claimed in claim 1, wherein the band prioritization selects variance, skewness, kurtosis, entropy or information divergence to calculate the priority score of each of the spectral bands.

4. The hyperspectral characteristic band selection method as claimed in claim 1, wherein, further selecting the characteristic bands from the spectral bands by full band analysis method or averaging method.

5. The hyperspectral characteristic band selection method as claimed in claim 4, wherein the predetermined disease is diabetes, when computing analysis is performed by the averaging method, the number of the selected bands is preferably 1 time the number of the endmembers.

6. The hyperspectral characteristic band selection method as claimed in claim 4, wherein the predetermined disease is diabetes, and when computing analysis is performed by the band prioritization, the number of the selected bands is preferably 1.5 times the number of the endmembers.

7. The hyperspectral characteristic band selection method as claimed in claim 4, further comprising step C, compiling statistics of repetition times of the same characteristic bands selected by full band analysis method, averaging method and band prioritization respectively, and using the characteristic bands with repetition times reaching a predetermined threshold value as the preferred characteristic spectra.

8. An active hyperspectral imaging device comprising:
   a base;
   a plurality of light sources respectively disposed on the base, and bands emitted by each of the light sources being respectively configured according to the characteristic bands as claimed in claim 1; and
   a sensing portion disposed on the base and spaced apart from the light sources, and used for receiving reflected light from an external target object irradiated by the light sources to obtain a hyperspectral image.

9. The active hyperspectral imaging device as claimed in claim 8, wherein the light sources are arranged on the base annularly and around the sensing portion at a center position.

10. The active hyperspectral imaging device as claimed in claim 9, wherein the base comprises:
    a casing having a casing body and an assembly opening opened on the casing body, so that an inner space of the casing body communicates externally;
    a cover having a plate-shaped cover body connected to the casing body by corresponding to the assembly opening, a first hole with an appropriate diameter penetrating the cover body at a central position, and a recess with an appropriate depth recessed on one side of the cover body and communicated with the first hole; and
    a seat having an annular seat body and a second hole with an appropriate diameter axially penetrating the seat body along a center of the seat body, and the seat body being used for inserting into the recess to make the second hole coaxial with the first hole;
    wherein the light sources are arranged annularly on the seat body respectively by using the second hole as a center.

11. The active hyperspectral imaging device as claimed in claim 10, wherein the sensing portion comprises:
    a main body disposed in the inner space of the casing;
    a columnar image capturing lens disposed on the main body and used for passing through the first hole and the second hole, so that one end of a columnar shaft of the lens is exposed outside the casing, and another end of the columnar shaft of the lens is located in the inner space of the casing; and
    a processing unit disposed on the main body and electrically connected with the image capturing lens.

12. The active hyperspectral imaging device as claimed in claim 10, wherein the seat is made of ceramic material.

13. An active hyperspectral imaging device comprising:
    a base;
    a plurality of light sources respectively disposed on the base, and bands emitted by each of the light sources being respectively configured according to the preferred characteristic bands as claimed in claim 7; and
    a sensing portion disposed on the base and spaced apart from the light sources, and used for receiving reflected light from an external target object irradiated by the light sources to obtain a hyperspectral image.

14. The active hyperspectral imaging device as claimed in claim 13, wherein the light sources are arranged on the base annularly and around the sensing portion at a center position.

15. The active hyperspectral imaging device as claimed in claim 14, wherein the base comprises:
    a casing having a casing body and an assembly opening opened on the casing body, so that an inner space of the casing body communicates externally;
    a cover having a plate-shaped cover body connected to the casing body by corresponding to the assembly opening, a first hole with an appropriate diameter penetrating the cover body at a central position, and a recess with an appropriate depth recessed on one side of the cover body and communicated with the first hole; and a seat having an annular seat body and a second hole with an appropriate diameter axially penetrating the seat body along a center of the seat body, and the seat body being used for inserting into the recess to make the second hole coaxial with the first hole;

wherein the light sources are arranged annularly on the seat body respectively by using the second hole as a center.

16. The active hyperspectral imaging device as claimed in claim 15, wherein the sensing portion comprises:

a main body disposed in the inner space of the casing;

a columnar image capturing lens disposed on the main body and used for passing through the first hole and the second hole, so that one end of a columnar shaft of the lens is exposed outside the casing, and another end of the columnar shaft of the lens is located in the inner space of the casing; and a processing unit disposed on the main body and electrically connected with the image capturing lens.

17. The active hyperspectral imaging device as claimed in claim 15, wherein the seat is made of ceramic material.

* * * * *